(12) United States Patent
Adhav et al.

(10) Patent No.: US 11,798,068 B1
(45) Date of Patent: Oct. 24, 2023

(54) LEASE MANAGEMENT SYSTEM WITH LEASE MANAGEMENT MARKETPLACE SOCIAL NETWORK AND RELATED METHODS

(71) Applicant: LeaseCake, Inc., Winter Park, FL (US)

(72) Inventors: Shailesh Taj Adhav, Winter Park, FL (US); James W Bankston, Winter Park, FL (US); David Schrader, Orlando, FL (US); Marco Ledesma, Orlando, FL (US)

(73) Assignee: LEASECAKE, INC., Winter Park, FL (US)

( * ) Notice: Subject to any disclaimer, the term of this patent is extended or adjusted under 35 U.S.C. 154(b) by 373 days.

(21) Appl. No.: 16/675,707

(22) Filed: Nov. 6, 2019

Related U.S. Application Data

(60) Provisional application No. 62/756,196, filed on Nov. 6, 2018.

(51) Int. Cl.
 *G06Q 30/0645* (2023.01)
 *G06Q 50/16* (2012.01)
 *G06Q 50/00* (2012.01)

(52) U.S. Cl.
 CPC ........... *G06Q 30/0645* (2013.01); *G06Q 50/01* (2013.01); *G06Q 50/163* (2013.01)

(58) Field of Classification Search
 CPC .... G06Q 30/0645; G06Q 50/163; G06Q 50/01
 See application file for complete search history.

(56) References Cited

U.S. PATENT DOCUMENTS

| | | | |
|---|---|---|---|
| 7,174,301 B2 | 2/2007 | Florance et al. | |
| 7,254,559 B2 | 8/2007 | Florance et al. | |
| 7,636,687 B2 | 12/2009 | Foster et al. | |
| 7,640,204 B2 | 12/2009 | Florance et al. | |
| 10,445,843 B1* | 10/2019 | Catalano | G06Q 30/0625 |
| 2001/0037273 A1 | 11/2001 | Greenlee, Jr. | |
| 2006/0206342 A1* | 9/2006 | Shoen et al. | G06Q 10/0875 705/16 |
| 2009/0240565 A1* | 9/2009 | Calonge | G06Q 20/102 705/307 |
| 2012/0158561 A1* | 6/2012 | Gannon et al. | G06Q 40/06 705/34 |
| 2014/0122346 A1* | 5/2014 | O'Brien et al. | G06Q 30/0645 705/307 |
| 2015/0106278 A1 | 4/2015 | Florance et al. | |
| 2016/0086294 A1* | 3/2016 | Khamis | G06Q 50/16 705/38 |
| 2017/0017646 A1* | 1/2017 | Kumar et al. | G06Q 10/10 |
| 2017/0032339 A1* | 2/2017 | Goldman | G06Q 20/102 |
| 2018/0060981 A1* | 3/2018 | Sher | G06Q 50/163 |

FOREIGN PATENT DOCUMENTS

KR          101707603 B1*   2/2017

* cited by examiner

*Primary Examiner* — Jan P Mincarelli
(74) *Attorney, Agent, or Firm* — Allen, Dyer, Doppelt & Gilchrist, PA

(57) ABSTRACT

A lease management system is for providing a lease management marketplace social network. A server may be configured to provide a landlord web interface, a tenant web interface, and a third party web interface, respectively for a landlord user, a tenant user, and a third party user for accessing a lease management database, the landlord web interface, the tenant web interface, and the third party web interface each accessing different portions of the lease management database. The server may be configured to ingest a lease document via the landlord web interface into the lease management database, and receive tenant values via the tenant web interface into the lease management database. The server may be configured to when a match between the tenant user and the landlord user exists, connect the landlord user and the tenant user in the lease management marketplace social network.

15 Claims, 42 Drawing Sheets

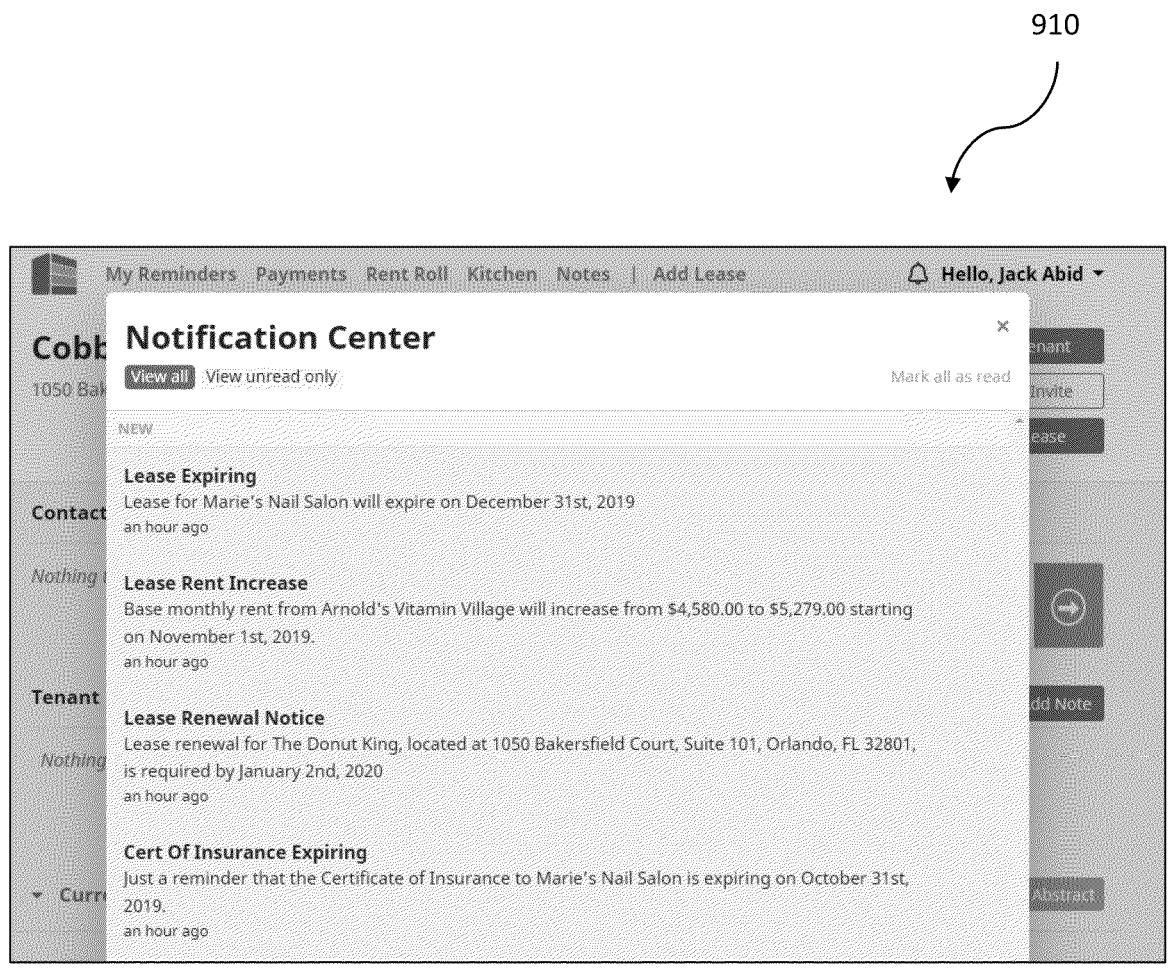
FIG. 8D-A

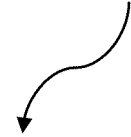

915

Hi Jack Abid,

Just a reminder that the base monthly rent for Arnold's Vitamin Village will Increase to $5,279.00 starting on November 1st, 2019

Arnold's Vitamin Village agreement with Kitchenette Plaza, Inc.
Current Base Monthly Rent: $4,580.00
Increase $699.00
New Base Monthly Rent: $5,279.00.

Property Address
365 Cinnamon Circle
Winter Park, FL 32789

Leasecake has the above information and other tenant details available for you 24/7 at Leasecake.com. Hope this helps!

View Tenant and Lease Details

Kind regards,

*The Leasecake Team*

To update your notification preferences, please visit your Leasecake account and click on the bell icon next to your profile!

| My Reminders  Payments  Rent Roll  Kitchen  Notes  |  Add Lease | 🔔 Hello, Jack Abid ▾ |

Rent Roll
Today is Tuesday, October 22nd

Tenant ↓≡
⬇ Rent Roll Report

▲ Bakersfield Plaza, LLC

Cobbler's Shoe Repair — $3,560
1050 Bakersfield Court, Suite 103 — 3,700 sf @ $11.55
Exp: 09/30/2020

House of Pancakes — $1,500
1050 Bakersfield Court, Suite 104 — 1,200 sf @ $15
Exp: 04/30/2025

Marie's Nail Salon — $5,300
1050 Bakersfield Court, Suite 102 — 4,200 sf @ $15.14
Exp: 12/31/2019

Mobile Solutions Co. — $2,950
123 Landstreet — 2,000 sf @ $17.70
Land Lease - Cell Tower — Exp: 11/30/2023

The Donut King — $4,500
1050 Bakersfield Court, Suite 101 — 2,900 sf @ $18.62
Exp: 03/02/2020

*No Active Lease*
100 SR 434, A — 3,000 sf
Palm Springs Shopping Village
👤 Add Tenant

*No Active Lease*
100 SR 434, B — 5,500 sf
Palm Springs Shopping Village
👤 Add Tenant

*No Active Lease*
100 SR 434, C — 7,000 sf
Palm Springs Shopping Village
👤 Add Tenant

*No Active Lease*
100 SR 434, D — 2,500 sf
Palm Springs Shopping Village
👤 Add Tenant ▲ Kitchenette Plaza, Inc.

Apple of My Eye Optometry — $5,500
365 Cinnamon Circle, Suite B — 900 sf @ $73.33
Exp: 05/31/2022

Arnold's Vitamin Village — $4,580
365 Cinnamon Circle, Suite A — 2,341 sf @ $23.48
Exp: 01/31/2026

Gourmet Kitchens, Inc. — $6,450
134 Tiramisu Terrace, Suite B — 4,990 sf @ $15.51
Exp: 12/31/2022

Julie's Walnut Factory — $2,400
134 Tiramisu Terrace, Suite A — 3,200 sf @ $9
Exp: 01/31/2025

Wendy's Construction, Inc. — $6,987
365 Cinnamon Circle, Suite C — 3,215 sf @ $26.08
Exp: 01/31/2023

| | My Reminders  Payments  Rent Roll  Kitchen  Notes  |  Add Lease | 🔔 Hello, Jack Abid ▾ |

Notes  　　　　　　　　　　　　　　　　　　　　　　　　　　　　　　　　　　　　　　＋ Add Note

👤 The Donut King　　　　　　　　　　　　　　　　　　　　　　　　　　　　　　　📅 Tue. 10-22-19
　　Agreed to waive the late fee for April 2018.

👤 The Donut King　　　　　　　　　　　　　　　　　　　　　　　　　　　　　　　📅 Tue. 10-22-19
　　Thanks for using Leasecake - it's great!

📍 1050 Bakersfield Court (Suite 101)　　　　　　　　　　　　　　　　　　　　　📅 Tue. 10-22-19
　　Joey called today to say the temperature seems to be higher than what the AC says. Promised I'd have someone
　　out there next week.　　　　　　　　　　　　　　　　　　　　　　　　　　　　　　　　　　… ▾

👤 Marie's Nail Salon　　　　　　　　　　　　　　　　　　　　　　　　　　　　　📅 Tue. 10-22-19
　　Marie mentioned that she will be out of town next month. And her assistant, Phil will be able to assist, if there's
　　any questions.　　　　　　　　　　　　　　　　　　　　　　　　　　　　　　　　　　　　… ▾

📍 1050 Bakersfield Court (Suite 102)　　　　　　　　　　　　　　　　　　　　　📅 Tue. 10-22-19
　　Let's double check the HVAC System on 6/15/2018. We can use the coupon.

👤 Cobbler's Shoe Repair　　　　　　　　　　　　　　　　　　　　　　　　　　　📅 Tue. 10-22-19
　　These guys have great shoelaces!

📍 1050 Bakersfield Court　　　　　　　　　　　　　　　　　　　　　　　　　　　📅 Tue. 10-22-19
　　Need to get out there and check the sprinklers. Several calls stating they are going off at random times.

👤 Gourmet Kitchens, Inc.　　　　　　　　　　　　　　　　　　　　　　　　　　　📅 Tue. 10-22-19
　　Check the squeaky back door. Replace the hinge?

📍 134 Tiramisu Terrace (Suite B)　　　　　　　　　　　　　　　　　　　　　　　📅 Tue. 10-22-19
　　Thanks for using Leasecake - It's great!

📍 134 Tiramisu Terrace (Suite B)　　　　　　　　　　　　　　　　　　　　　　　📅 Tue. 10-22-19
　　Check the AC …

👤 Apple of My Eye Optometry　　　　　　　　　　　　　　　　　　　　　　　　　📅 Tue. 10-22-19
　　They agreed to extend the lease - talk to the Doc!

LEASE MANAGEMENT SYSTEM WITH LEASE MANAGEMENT MARKETPLACE SOCIAL NETWORK AND RELATED METHODS

RELATED APPLICATION

This application is based upon prior filed copending Application No. 62/756,196 filed Nov. 6, 2018, the entire subject matter of which is incorporated herein by reference in its entirety.

TECHNICAL FIELD

The present disclosure relates to the field of management systems, and, more particularly, to a lease management system and related methods.

BACKGROUND

In the pre-Internet age, when seeking information regarding real estate, the user was quite often frustrated with incomplete listings and outdated information. With the advent of the Internet Age and the real estate boom, several approaches to this issue were developed. Indeed, some online products have become near ubiquitous in the real estate business. For example, Trulia and Zillow (as available from Zillow, Inc. of Seattle, Washington) are both home and neighborhood websites that are routinely used in the real estate field.

Although the existing approaches are helpful in the real estate purchasing market, there are some drawbacks in the rental market. Primarily, since real estate purchase details are public record and available on the Internet, these approaches have updated and correct data for the real estate purchase market. Since real estate rental agreements are not public record, the data for this market is spotty, if not totally unavailable.

On the other hand, on the landlord side of the real estate rental market, existing approaches to managing tenant interactions are less than optimal. Indeed, it is not uncommon for landlords and tenants to manually manage their leases.

SUMMARY

Generally, a lease management system is for providing a lease management marketplace social network. The lease management system may include a first communications device associated with a landlord user. The lease management system also may include a second communications device associated with a tenant user. The lease management system also may include a server in communication with the first communications device and the second communications device. The server may be configured to store a lease management database associated with the lease management marketplace social network, and provide a landlord web interface and a tenant web interface respectively for the landlord user and the tenant user for accessing the lease management database, the landlord web interface and the tenant web interface each accessing different portions of the lease management database. The server may be configured to ingest at least one lease document via the landlord web interface into the lease management database, each lease document comprising a plurality of lease characteristic values, and receive a plurality of tenant values via the tenant web interface into the lease management database. The server may be configured to determine a match between the tenant user and the landlord user by correlating a respective lease document and at least one tenant value, and when the match between the tenant user and the landlord user exists, connect the landlord user and the tenant user in the lease management marketplace social network.

The server may be configured to, when the third party user is connected with at least one of the landlord user and the tenant user in the lease management marketplace social network, provision the third party user to have access to data associated with the at least one of the landlord user and the tenant user in the lease management database. In some embodiments, the server may be configured to ingest the at least one lease document based upon a text recognition process.

Additionally, the at least one lease document may comprise a plurality of lease documents associated with the landlord user, and the server may be configured to provide, within the landlord web interface, a rent roll interface comprising a continuous timeline for a plurality of scheduled rent payments for the plurality of lease documents.

The server may be configured to provide, within the landlord web interface, a property status interface for the plurality of lease documents. The server may be configured to cross-reference data in the landlord web interface and the tenant web interface based upon the match between the tenant user and the landlord user. The lease management system may further comprise a third communications device associated with a third party user, and the server may be configured to provide a third party web interface for accessing different portions of the lease management database.

In some embodiments, the server may be configured to provide, within the landlord web interface and the tenant web interface, a cumulative view comprising average values for the plurality of lease characteristic values within a geographic area. The server may be configured to aggregate data from a plurality of landlord users and a plurality of tenant users in the lease management database.

Another aspect is directed to a lease management marketplace social network system for a lease management marketplace social network. The lease management marketplace social network system may include a processor and a memory coupled thereto and configured to provide the lease management marketplace social network, and store a lease management database associated with the lease management marketplace social network, a landlord user and a tenant user being members of the lease management marketplace social network. The processor and memory may be configured to provide a landlord web interface and a tenant web interface respectively for the landlord user and the tenant user for accessing the lease management database, the landlord web interface and the tenant web interface each accessing different portions of the lease management database. The processor and memory may be configured to ingest at least one lease document via the landlord web interface into the lease management database, each lease document comprising a plurality of lease characteristic values. The processor and memory may be configured to receive a plurality of tenant values via the tenant web interface into the lease management database, determine a match between the tenant user and the landlord user by correlating a respective lease document and at least one tenant value, and when the match between the tenant user and the landlord user exists, connect the landlord user and the tenant user in the lease management marketplace social network.

Yet another aspect is directed to a method for operating a lease management system providing a lease management marketplace social network. The lease management system may include a first communications device associated with a landlord user, and a second communications device associated with a tenant user. The method may include storing a lease management database associated with the lease management marketplace social network. The method also may include providing a landlord web interface and a tenant web interface respectively for the landlord user and the tenant user for accessing the lease management database. The landlord web interface and the tenant web interface each may access different portions of the lease management database. The method may include ingesting at least one lease document via the landlord web interface into the lease management database. Each lease document may comprise a plurality of lease characteristic values, and receiving a plurality of tenant values via the tenant web interface into the lease management database. The method also may include determining a match between the tenant user and the landlord user by correlating a respective lease document and at least one tenant value, and when the match between the tenant user and the landlord user exists, connecting the landlord user and the tenant user in the lease management marketplace social network.

BRIEF DESCRIPTION OF THE DRAWINGS

FIGS. 9A-9M are screenshots from an example embodiment of the tenant web interface in the lease management system, according to the present disclosure.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

In existing approaches, do-it-yourself (DIY) commercial real estate owners lose money every month when they miss rent collections, late fees, and increases. Two-thirds of all commercial real estate (CRE) properties in the United States are less than 20,000 square feet, representing 3 million buildings. The small to mid-tier investors who own these buildings and lease space to 5.1 million tenants, lose money when they miss timely rent collections, late fees, rent increases, and lease expirations. There is a desire for an approach to replace their current fragmented tools, which include spreadsheets, calendar reminders, whiteboards, filing cabinets, and receiving checks in the mail. In addition, there is a desire to improve the network of owners, brokers, and tenants in order to create and grow trusted relationships.

Over a period of five years, a typical real estate portfolio of 30 tenants requires tracking up to 4,000 individual transactions and dates, referred to as "lease events." A missed lease event wastes time and money, causes needless friction, and reduces trust between all parties. With the current manual tools, it is daunting and costly to effectively track the volume of key lease events and communicate rapidly and seamlessly.

Figure 1:
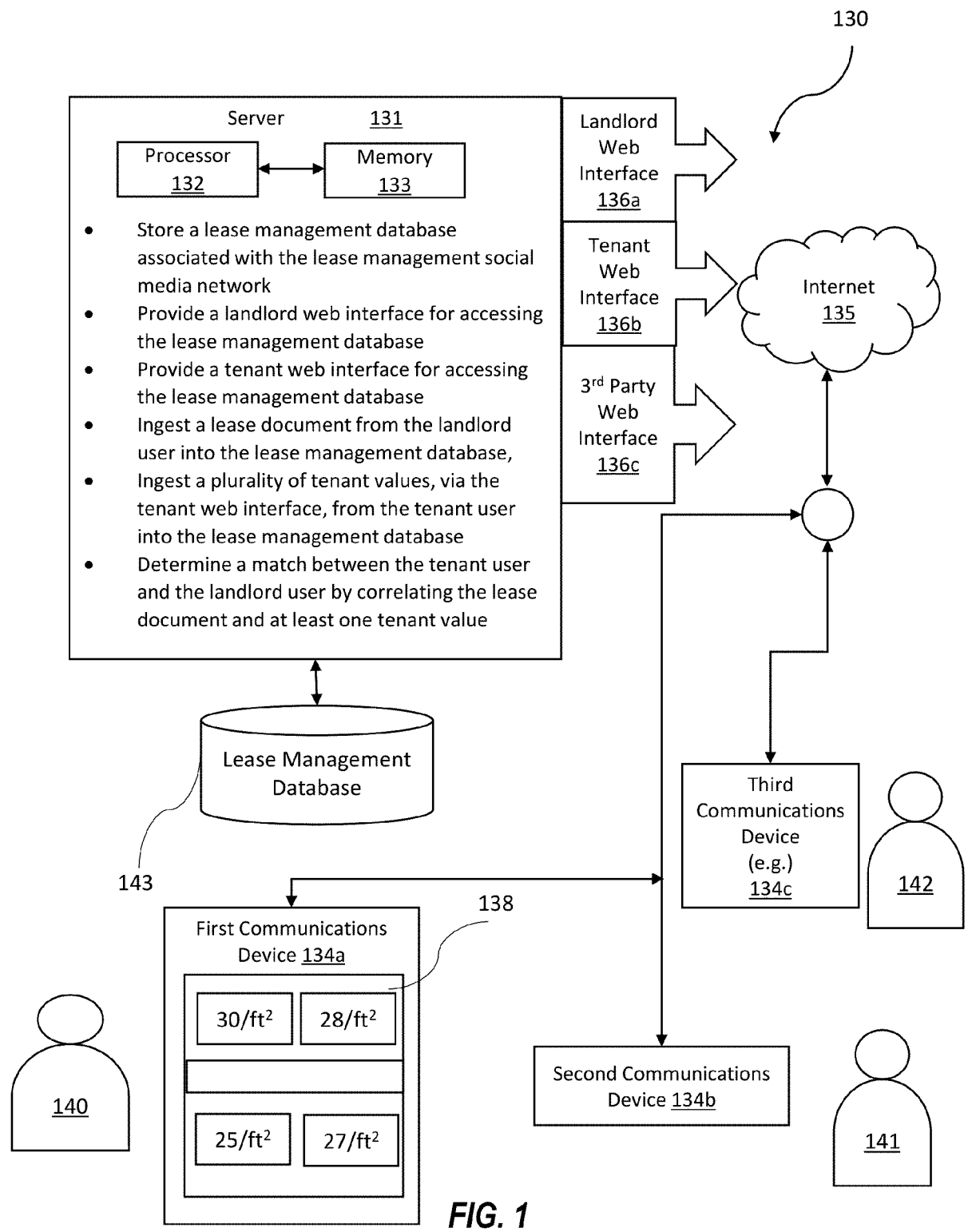
FIG. 1 is a schematic diagram of a lease management system, according to the present disclosure.

Referring initially to FIG. 1, a lease management system 130 according to the present disclosure is now described. The lease management system 130 is for providing a lease management marketplace social network 137 (i.e. a special purpose social network with management features) for a plurality of users comprising a landlord user 140, a tenant user 141, and a third party user 142. The lease management system 130 also provides an approach to the problems noted hereinabove.

The lease management system 130 illustratively includes a server 131 comprising a processor 132, and a memory 133 cooperating therewith. As will be appreciated, the server 131 may comprise a standalone computing device, or may be part of a cloud infrastructure, such as Amazon Web Services (AWS), or the Google Cloud Platform (GCP) for example.

The lease management system 130 illustratively includes a first communications device 134a associated with the landlord user 140, a second communications device 134b associated with the tenant user 141, and a third communications device 134c associated with the third party user 142. For example, the third party user 142 may comprise a vendor user, real estate broker user, a repair specialist user, a banker/lender user, a title company user, insurance broker user, accountant user or a lawyer user. Of course, this listing of third party user 142 types is merely exemplary and could include other categories.

For drawing clarity, only one of the landlord user 140, the tenant user 141, and the third party user 142 is shown, but it should be readily appreciated that the lease management system 130 could include a large number of users in each type.

The server 131 is in communication, via the Internet 135, with the first communications device 134a, the second communications device 134b, and the third communications device 134c. Each of the first communications device 134a, the second communications device 134b, and the third communications device 134c may comprise a mobile wireless communications device (e.g. a mobile cellular device), a personal computing device, a tablet computing device, or a virtual communications device, for example.

The server 131 is configured to store a lease management database 143 associated with the lease management marketplace social network 137 and provide a web interface 136a-136c for access to the lease management marketplace social network. In an example embodiment, the web interface 136a-136c comprises a Hypertext Markup Language (HTML) interface rendered with a web browser software application (e.g. mobile or desktop). In yet other embodiments, the web interface 136a-136c comprises a native application (i.e. an application written to run locally on an operating system of the respective device) running locally on one of the first communications device 134a, the second communications device 134b, and the third communications device 134c. In these native application embodiments, the web interface 136a-136c may also include an application programming interface (API) permitting the native application to access the server 131 and the lease management database 143 thereon.

The server 131 is configured to provide a landlord web interface 136a for accessing the lease management database 143 and provide a tenant web interface 136b for accessing the lease management database 143. The server 131 is configured to provide a third party web interface 136c for accessing the lease management database 143. In particular, the web interface 136a-136c may comprise unique interfaces for different types of users. For example, the third party web interface 136c may comprise current site responsibilities, relationships with the landlord user 140 or the tenant user 141, and a community rating profile. In some embodiments, the third party web interface 136c may include APIs for integrating with third party software (e.g. accounting systems, customer relation management systems, etc.) related to the third party user 142.

The server 131 is configured to ingest a lease document, via the landlord web interface 136a, from the landlord user 140 into the lease management database 143. Additionally, the server 131 is configured to alternatively or additionally ingest the lease document, via the tenant web interface 136b, from the tenant user 141 into the lease management database 143. The lease document comprises a plurality of lease characteristic values, which may comprise lease term length, monthly payment, tenant identity and address, landlord identity and address, rented premises location, renewal options, rent range dates, lease start date, etc. The server 131 is configured to process the plurality of lease characteristic values into a landlord data structure for storage in the lease management database 143. In some embodiments, the ingestion process requires manual entry in the web interface 136a-136c.

In other embodiments, the ingestion process may be automatic. In particular, the landlord user 140 may upload the lease document to the web interface 136a-136c, and the server is configured to parse the aggregate text of the lease document for the needed information. In some advantageous embodiments, when the lease document comprises an image format (i.e. non-text renderable file format), the server 131 is configured to execute an optical character recognition (OCR) process on the lease document to generate a text renderable document. Similarly, an image format may be scanned using artificial intelligence and machine learning to generate the plurality of lease characteristic values.

In yet other embodiments, the landlord user 140 may ingest a spreadsheet including data from multiple leased locations. The server 131 is configured to ingest the spreadsheet and create the multiple lease locations and the associated data for each of the leases, and to associate each of these leases with the landlord user 140 and the tenant user 141.

The server 131 is configured to ingest a plurality of tenant values, via the tenant web interface, from the tenant user 141 into the lease management database 143. The server 131 is configured to store the plurality of tenant values in a tenant data structure within the lease management database 143.

Figure 2:
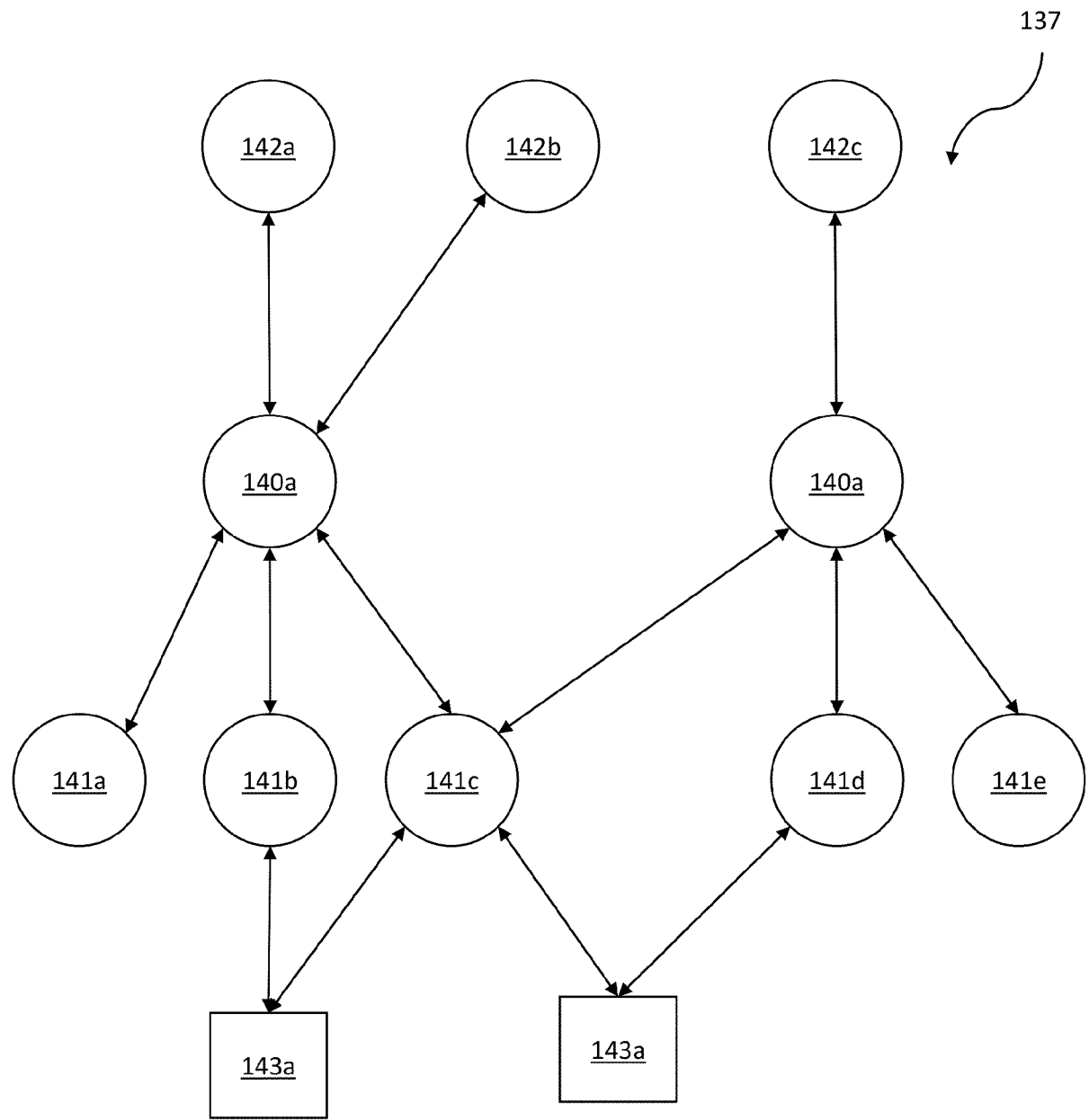
FIG. 2 is another schematic diagram of the lease management system, according to the present disclosure.

As will be appreciated and perhaps best seen in FIG. 2, the landlord user 140, the tenant user 141, and the third party user 142 are all part of the lease management marketplace social network 137, and the lease management database 143 includes relationships therebetween. For example, the relationships may comprise a tenant-landlord relationship, a landlord-third party relationship (e.g. landlord-vendor relationship), and a tenant-third party relationship (e.g. tenant-vendor relationship).

Also, the lease management marketplace social network 137 also includes team member relationships. In particular, the landlord user 140, and/or the tenant user 141, and the associated third party users 142 may be part of a team group.

The server 131 is configured to determine a match between the tenant user 141 and the landlord user 140 by correlating the lease document and at least one tenant value. Once this connection is made, the server 131 may cause the prompting of both the tenant user 141 and the landlord user 140 to confirm the relationship within the web interface 136a-136c.

Also, once the relationship is established, any missing data can be auto-populated from known data from the other connected party. For example, when the tenant user 141 does not know all the characteristics of the lease document, the server 131 is configured to populate that information from the uploaded lease document associated with the connected landlord user 140. Also, in some embodiments, the server 131 will not auto-populate data without consent of the user who was the source of the data.

The server 131 is configured to match the landlord user 140 and the tenant user 141, i.e. a lease unification process without active search from each user. Indeed, the server 131 is configured to review the lease management database 143 for potential matches and prompts the landlord user 140 and the tenant user 141 to confirm matches.

In some embodiments, the matching of users is based upon matching a threshold number of tenant values with the plurality of lease characteristic values. For example, a match may be determined when two or more of these values match. In some embodiments, matching lease characteristic values may have respective different score values, and a match may be determined when a total score of matching lease characteristic values exceeds a score threshold.

The server 131 is configured to provide, within the web interface 136a-136c, a cumulative view comprising average values for the plurality of lease characteristic values for a plurality of lease documents (i.e. lease documents being sources from one or more landlord users 140). In one embodiment, based upon a location data of the tenant user 141, the server 131 is configured to render in the web interface 136a-136c a geographic map including the location data (e.g. a set radius around the point indicated by the location data). As will be appreciated, the location data may be generated by a location device (e.g. global positioning system (GPS) device) of the associated communications device 134a-134c.

The server 131 is configured to generate layers of data over the geographic map, and may include average lease rates for the area. Advantageously, since the average lease rates are based upon the ingested lease documents associated with the area, the data is accurate and up-to-date. This, of course, provides an approach to the existing problem in the rental real estate market.

The server 131 is configured to provide real time information to the user, while in the field. Helpfully, when the tenant user 141 is scouting real estate for rent, the user can access the second communications device 134b and see a location specific rental market analysis based upon actual correct data.

Moreover, the server 131 is configured to proactively reach out to potential new users based upon existing data. For example, when the landlord user 140 ingests the lease document, the server 131 is configured to contact (e.g. e-mail, text message) the noted tenant to register as a tenant user 141 in the lease management marketplace social network 137. This same functionality applies to the third party user 142 when the landlord user 140 enters in the relevant information in the lease management marketplace social network 137. Moreover, this invitation process can occur in reverse, i.e. the landlord is invited to join the lease management marketplace social network 137 when the tenant user 141 ingests the lease document within the web interface 136a-136c.

Also, in the lease management marketplace social network 137, each of the users 140-142 has a respective set of permissions to edit and view information in the lease management database 143. In some embodiments, the permissions may be related to existing relationships. For example, the tenant user 141 can edit tenant identity information associated with lease document associated with the connected landlord user 140. More so, a third party user 142 comprising a lender may have permission to see a static rent roll of the landlord user 140. Third party user 142 comprising an insurance broker can view unit certificate of insurance status and upload the certificate of insurance to the associated account in the lease management marketplace social network 137. A third party user 142 comprising a real estate broker may have permission to see an active rent roll of the landlord user 140. A third party user 142 comprising an accountant may have permission to see lease documents of the tenant user 141 for accurate financial reporting. A third party user 142 comprising a service provider may have permission to see a unit level information of the landlord user 140 and has the permission to upload service documents. A third party user 142 comprising a lawyer may have permission to see the lease document of the landlord user 140 and has the permission to upload new document templates.

Figure 3A:
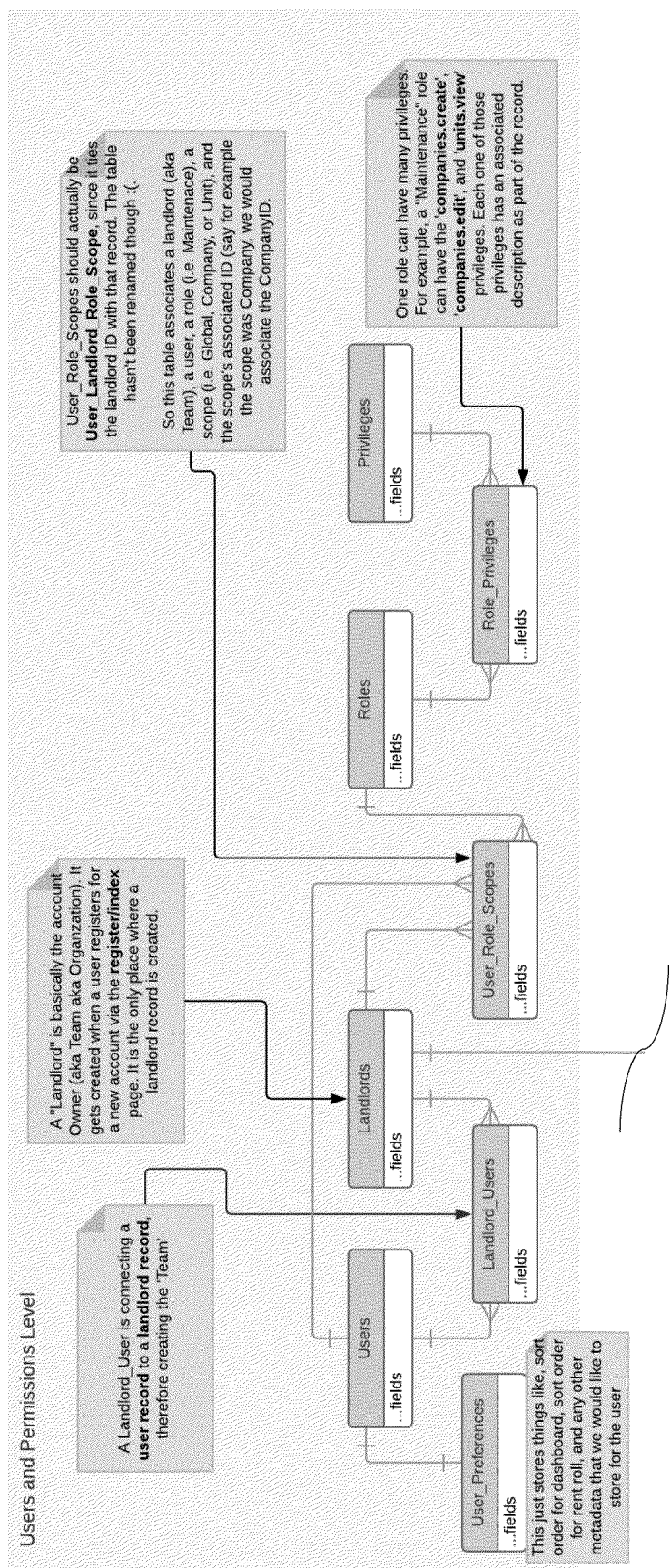
FIGS. 3A-3C are portions of a landlord data structure in the lease management system, according to the present disclosure.
Figure 3B:
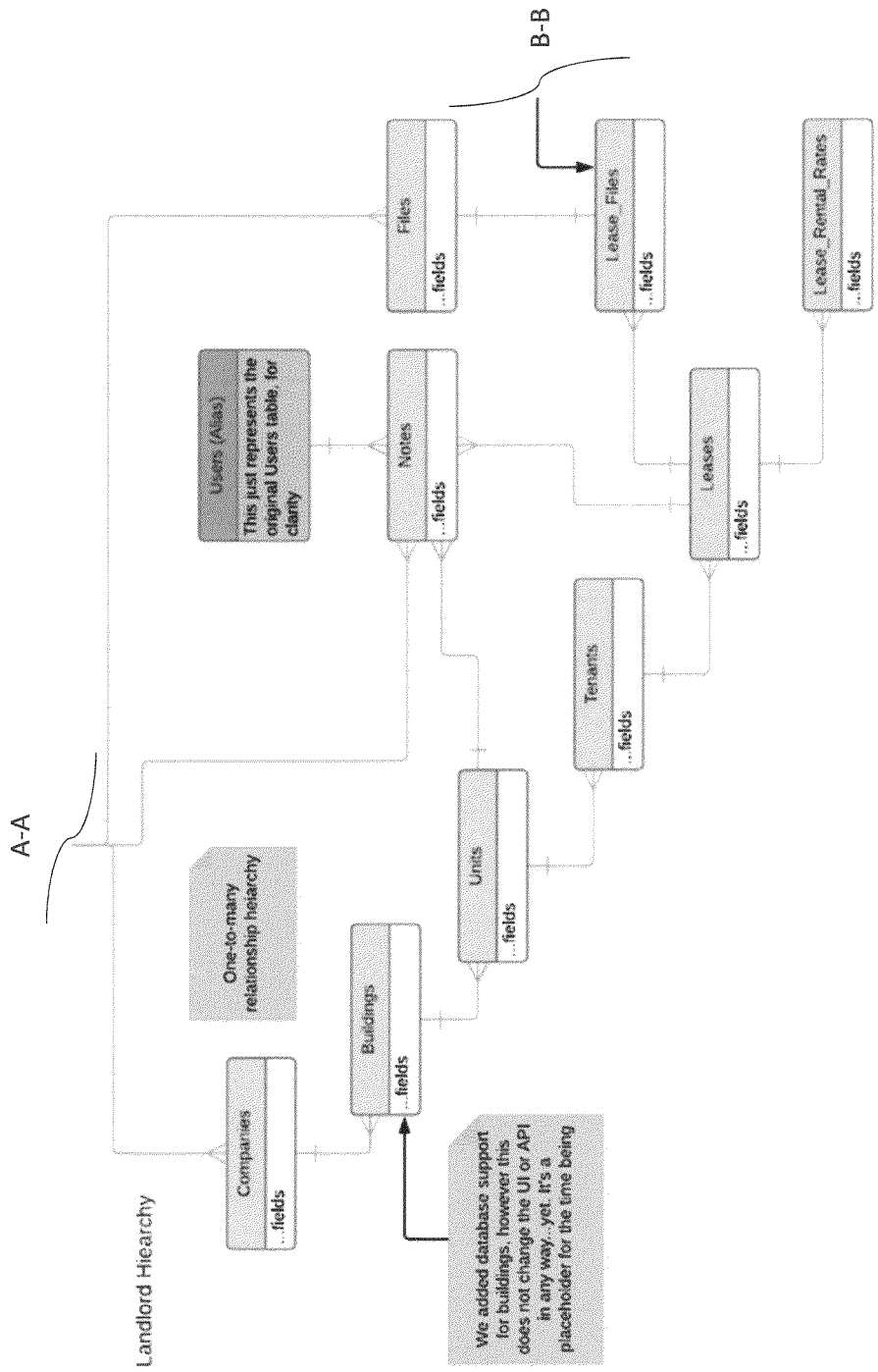
Figure 3C:
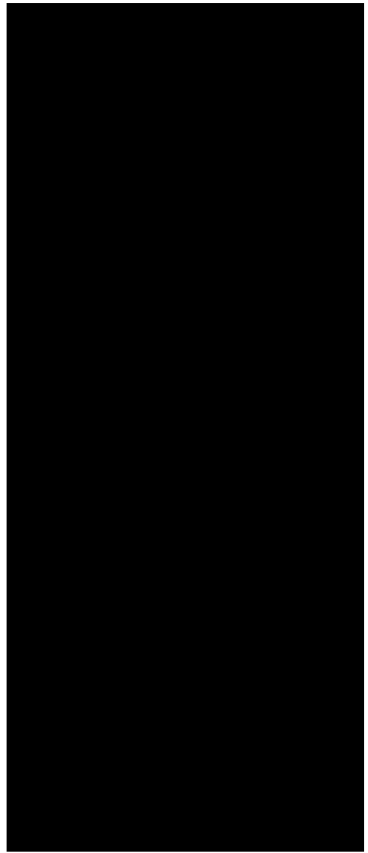
Figure 3C:
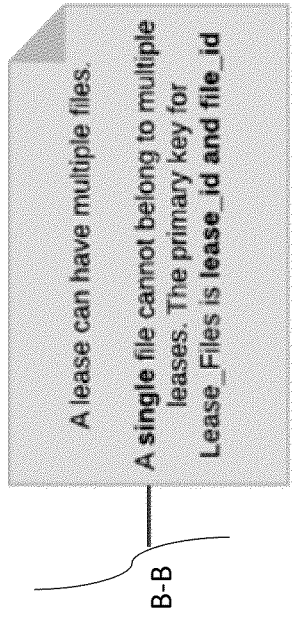
Figure 4:
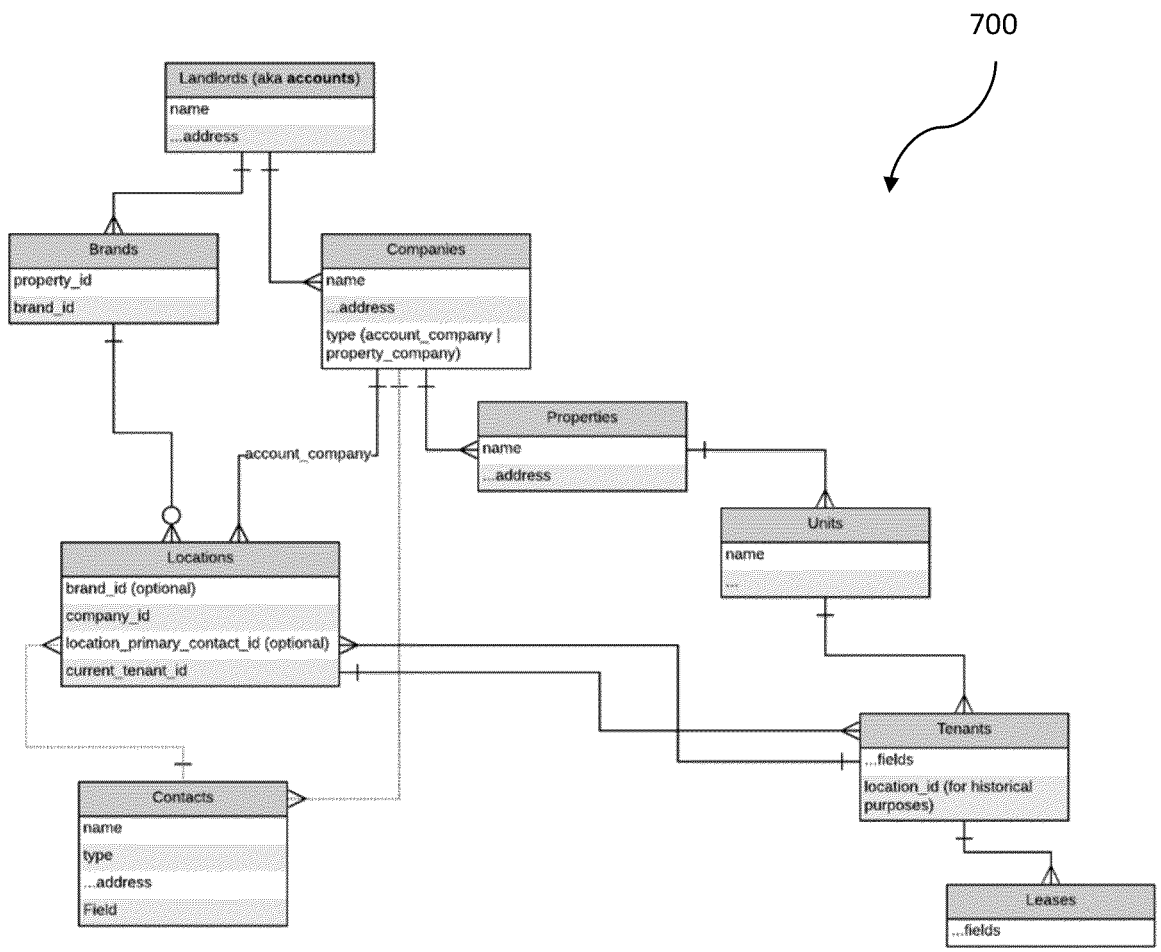
FIG. 4 is a multi-location tenant data structure in the lease management system, according to the present disclosure.
Figure 5:
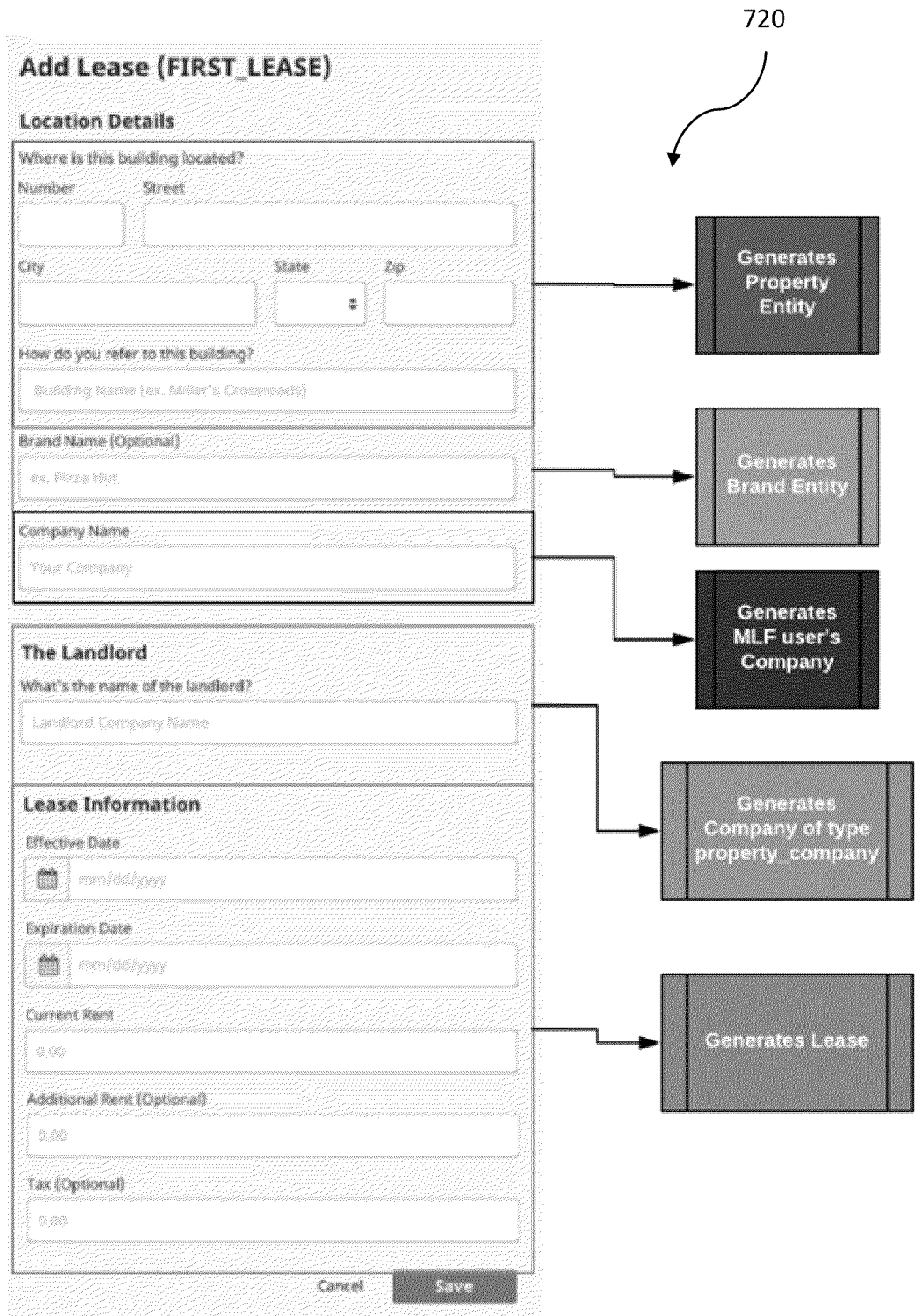
FIGS. 5 and 6 are flowcharts illustrating a data entry process in the lease management system, according to the present disclosure.
Figure 6:
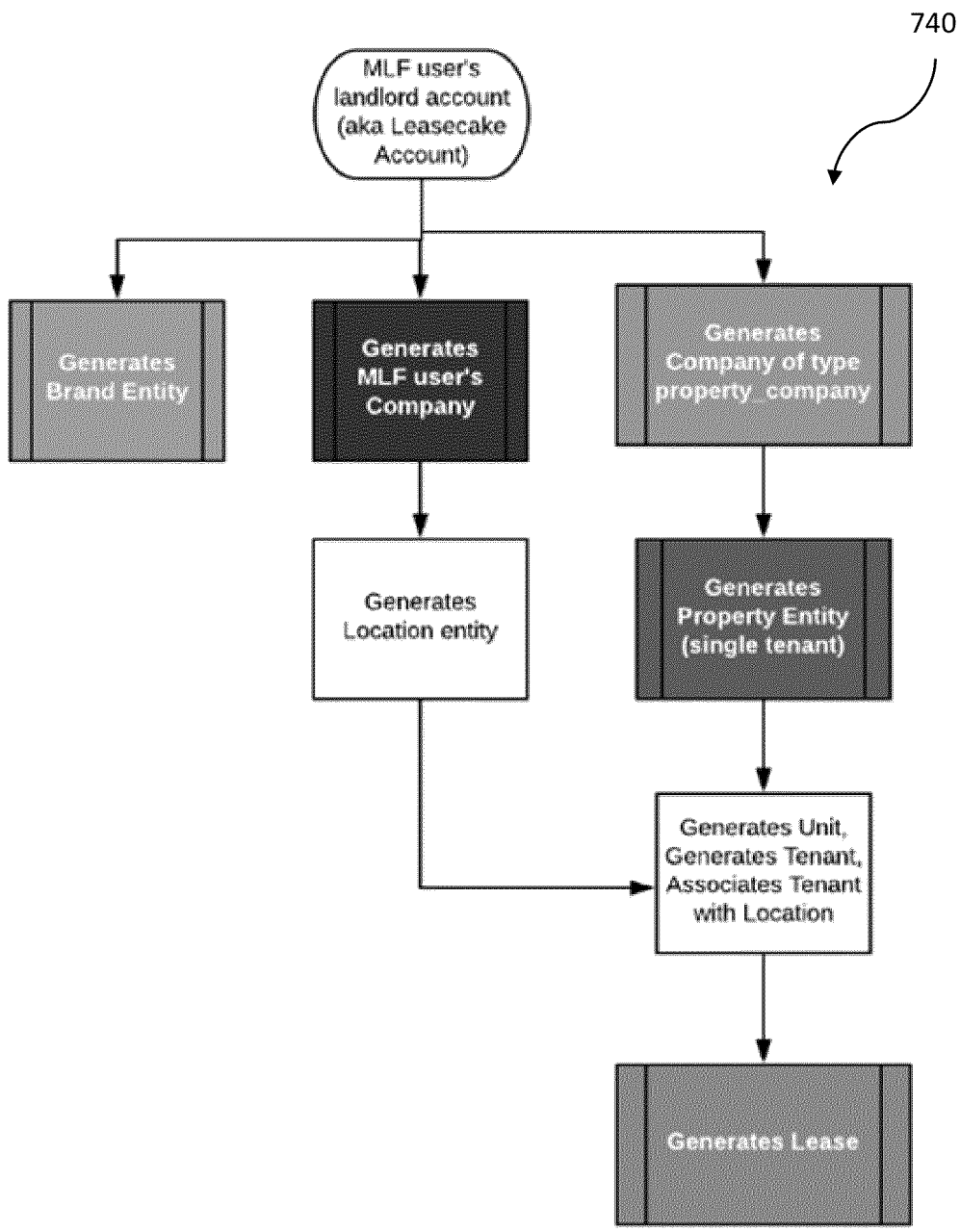
Figure 7:
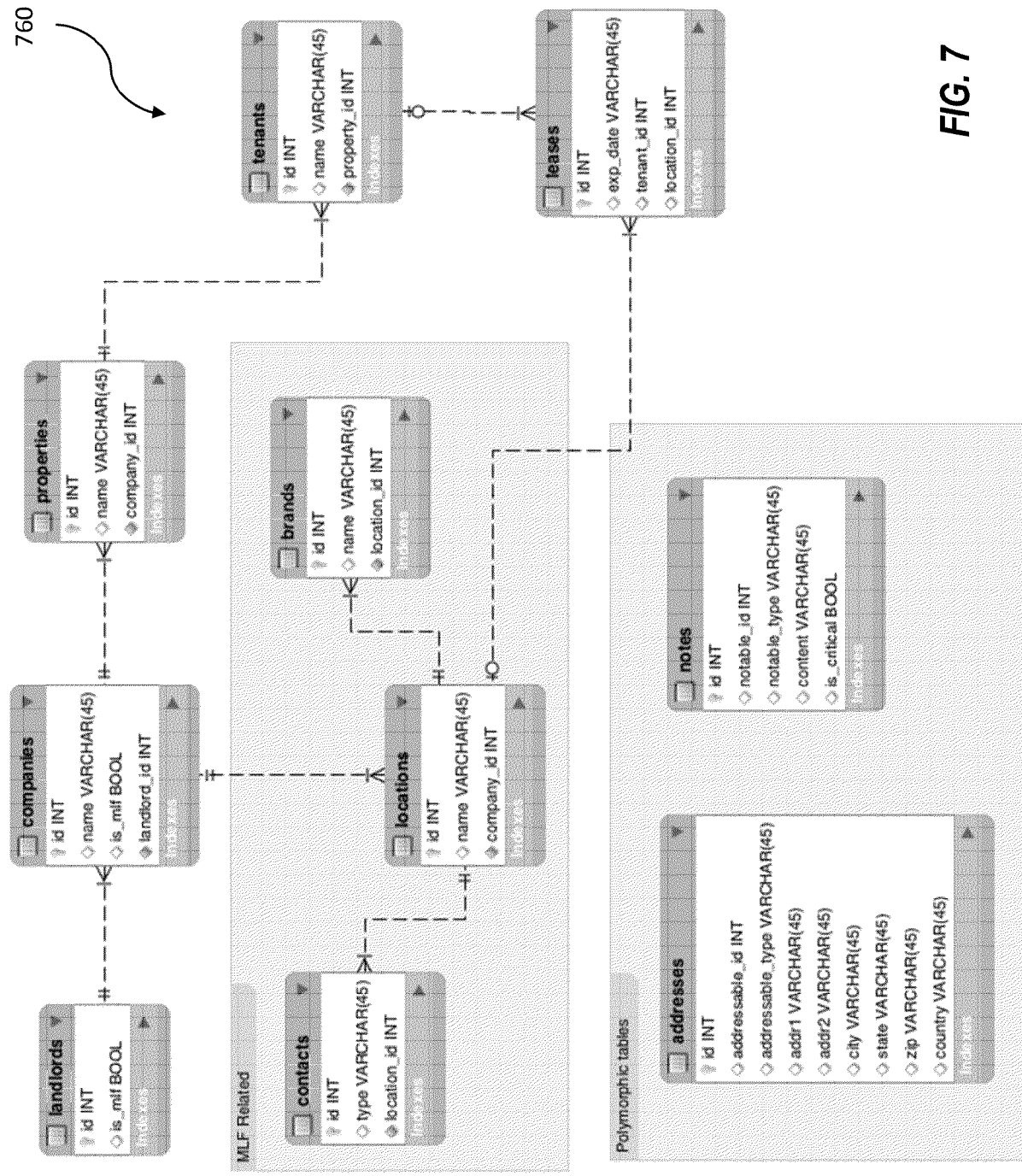
FIG. 7 is a landlord and tenant data structure in the lease management system, according to the present disclosure.

In FIGS. 3A-3C, a landlord data structure is depicted. In FIG. 4, a multi-location tenant data structure 700 is depicted. For example, in this illustrated embodiment, the data structure is a table. In FIGS. 5-6, diagrams 720, 740 illustrate the process for lease data input is depicted. In FIG. 6, the process for lease data input of a second lease is depicted. FIG. 7 shows a landlord and tenant data structure 760 in the lease management system 130.

Referring again to FIGS. 1-2, a lease management system 130 is for providing a lease management marketplace social network 137. As will be appreciated, the lease management marketplace social network 137 comprises a plurality of users 140-142 comprising a landlord user 140, a tenant user 141, and a third party user 142.

The lease management system 130 illustratively includes a first communications device 134a associated with the landlord user 140, a second communications device 134b associated with the tenant user 141, and a third communications device 134c associated with a third party user 142. For example, the third party user 142 may comprise a vendor or a service provider user associated with one or both of the landlord user 140 and the tenant user 141.

The lease management system 130 illustratively includes a server 131 in communication with the first communications device 134a, the second communications device 134b, and the third communications device 134c. The server 131 is configured to store a lease management database 143 associated with the lease management marketplace social network 137. As will be appreciated, the lease management database 143 comprises data structures for storing data related to the members of the lease management marketplace social network 137. For example, each user has an associated user profile within the lease management database 143 for organizing the related data.

Also, the server 131 is configured to provide or render a landlord web interface 136a, a tenant web interface 136b, and a third party web interface 136c for accessing different portions of the lease management database 143 respectively for the landlord user 140, the tenant user 141, and the third party user 142. In the illustrated embodiments, the web interfaces 136a-136c are provided within a web browser.

Each of the landlord web interface 136a, the tenant web interface 136b, and the third party web interface 136c each accesses different portions of the lease management database 143. In other words, the server 131 is configured to provide tiered access to the lease management database 143 based upon respective user privileges. The server 131 is configured to, when the third party user 142 is connected with the landlord user 140 or the tenant user 141 in the lease management marketplace social network, provision the third party user to have access to data associated with the landlord user and/or the tenant user in the lease management database 143.

Indeed, each of the users 140-142 may configure their respective accounts to provide detailed permissions to connected and non-connected users. For example, the landlord user 140 may permit certain third party users 142, such as a lawyer, to adjust (i.e. global read, write, and change permissions for lease documents) any of stored and associated lease documents associated with the profile of the landlord user, and the landlord user may permit tenant users 141 associated with a particular property and lease document to view the lease document (i.e. individual read permissions only). In other words, for the landlord user 140, each property and associated lease document has individual permissions properties.

The server 131 is configured to ingest a plurality of legal documents (e.g. lease documents) via one or more of the landlord web interface 136a, the tenant web interface 136b, and the third party web interface 136c into the lease management database 143. As will be appreciated, each lease document comprises a plurality of lease characteristic values. For example, the plurality of lease characteristic values may comprise a lease term length, tenant identity and address, landlord identity and address, leased premises address, base lease payment, lease renewal options, taxes payment, CAM payment, lease start date, and lease end date, etc. In some embodiments, the server 131 is configured to ingest the plurality of lease documents based upon a text recognition process (e.g. optical character recognition (OCR)) to automatically generate the plurality of lease characteristic values. In other embodiments (FIGS. 9I-9L), the server 131 is configured to provide a manual interface for manually receiving the plurality of lease characteristic values.

The server 131 is configured to receive a plurality of tenant values via the tenant web interface 136b into the lease management database 143. The plurality of tenant values may comprise a tenant name value, a leased premises address, base lease payment, lease renewal options, taxes payment, CAM payment, lease start date, lease end date, lease term length, tenant identity and address, and landlord identity and address.

The server 131 is configured to determine a match between the tenant user 141 and the landlord user 140 by correlating a respective lease document and at least one tenant value. The server 131 is configured to determine a match between the third party user 142 and either or both of the tenant user 141 and the landlord user 140. When a match has been determined, the server 131 is configured to create a connection between respective users in the lease management marketplace social network 137.

Once the connection is made in the lease management marketplace social network 137, the server 131 is configured to cross-reference and cross-populate data in the landlord web interface 136a, the tenant web interface 136b, and the third party web interface 136c based upon the match between the tenant user 141, the landlord user 140, and the third party user 142. In other words, the server 131 is configured to auto populate missing information with the landlord web interface 136a, the tenant web interface 136b, and the third party web interface 136c based upon available information in the connected user profiles.

In the illustrated embodiment, the server 131 is configured to provide, within the landlord web interface 136a, a cumulative view 138 (via an onboard display of the first communications device 134a) comprising average values for the plurality of lease characteristic values within a geographic area (e.g. a municipality, zip code, or area code). Of course, the cumulative view 138 may be provided similarly for the tenant user 141 and the third party user 142 respectively on the second communications device 134b and the third communications device 134c.

As perhaps best seen in FIG. 2, the server 131 is configured to aggregate data from a plurality of landlord users 140a-140b, a plurality of tenant users 141a-141e, and a plurality of third party users 142a-142 in the lease management database 143. Using the aggregated data, the server 131 is able to leverage the crowdsourced data from the plurality of landlord users 140a-140b, the plurality of tenant users 141a-141e, and the plurality of third party users 142a-142c to provide more accurate data in the cumulative view 138.

Additionally, as will be appreciated, the lease management database 143 includes the plurality of lease documents associated with the landlord user 140. The server 131 is configured to provide, within the landlord web interface 136a, a rent roll interface (FIG. 8K) comprising a continuous timeline for a plurality of scheduled rent payments for the plurality of lease documents. The server 131 is configured to provide, within the landlord web interface 136a, a property status interface (FIGS. 8Q-8R) for the plurality of lease documents.

In some embodiments, the third party web interface 136c illustratively includes a data entry interface for multiple user types. For example, the third party user 142 may configure and provision accounts in the lease management marketplace social network 137 for the landlord user 140 and the tenant user 141. For example, when the third party user 142 is a broker agent, the broker agent can provision the accounts for the tenant and the landlord.

Another aspect is directed to a lease management marketplace social network system 130 for a lease management marketplace social network 137. The lease management marketplace social network system 130 includes a processor 132 and a memory 133 coupled thereto and configured to provide the lease management marketplace social network 137, and store a lease management database 143 associated with the lease management marketplace social network. A landlord user 140, a tenant user 141, and a third party user 142 may be members of the lease management marketplace social network 137. The processor 132 and memory 133 is configured to provide a landlord web interface 136a and a tenant web interface 136b respectively for the landlord user 140 and the tenant user 141 for accessing the lease management database 143, the landlord web interface and the tenant web interface each accessing different portions of the lease management database. The processor 132 and memory 133 is configured to ingest at least one lease document via the landlord web interface 136a into the lease management database 143, each lease document comprising a plurality of lease characteristic values. The processor 132 and memory 133 is configured to receive a plurality of tenant values via the tenant web interface 136b into the lease management database 143, determine a match between the tenant user 141 and the landlord user 140 by correlating a respective lease document and at least one tenant value, and when the match between the tenant user and the landlord user exists, connect the landlord user and the tenant user in the lease management marketplace social network 137.

Yet another aspect is directed to a method for operating a lease management system 130 providing a lease management marketplace social network 137. The lease management system 130 includes a first communications device 134a associated with a landlord user 140, and a second communications device 134b associated with a tenant user 141. The method includes storing a lease management database 143 associated with the lease management marketplace social network 137. The method also includes providing a landlord web interface 136a and a tenant web interface 136b respectively for the landlord user 140 and the tenant user 141 for accessing the lease management database 143, the landlord web interface and the tenant web interface each accessing different portions of the lease management database 143. The method includes ingesting at least one lease document via the landlord web interface 136a into the lease management database 143, each lease document comprising a plurality of lease characteristic values, and receiving a plurality of tenant values via the tenant web interface 136b into the lease management database 143. The method also include determining a match between the tenant user 141 and the landlord user 140 by correlating a respective lease document and at least one tenant value, and when the match between the tenant user and the landlord user exists, connecting the landlord user and the tenant user in the lease management marketplace social network 137.

Referring now to FIGS. 8A-9L, an exemplary embodiment of the web interface 136a-136c is now described. In particular, the landlord web interface 136a is described with reference to FIGS. 8A-8W.

Figure 8A:
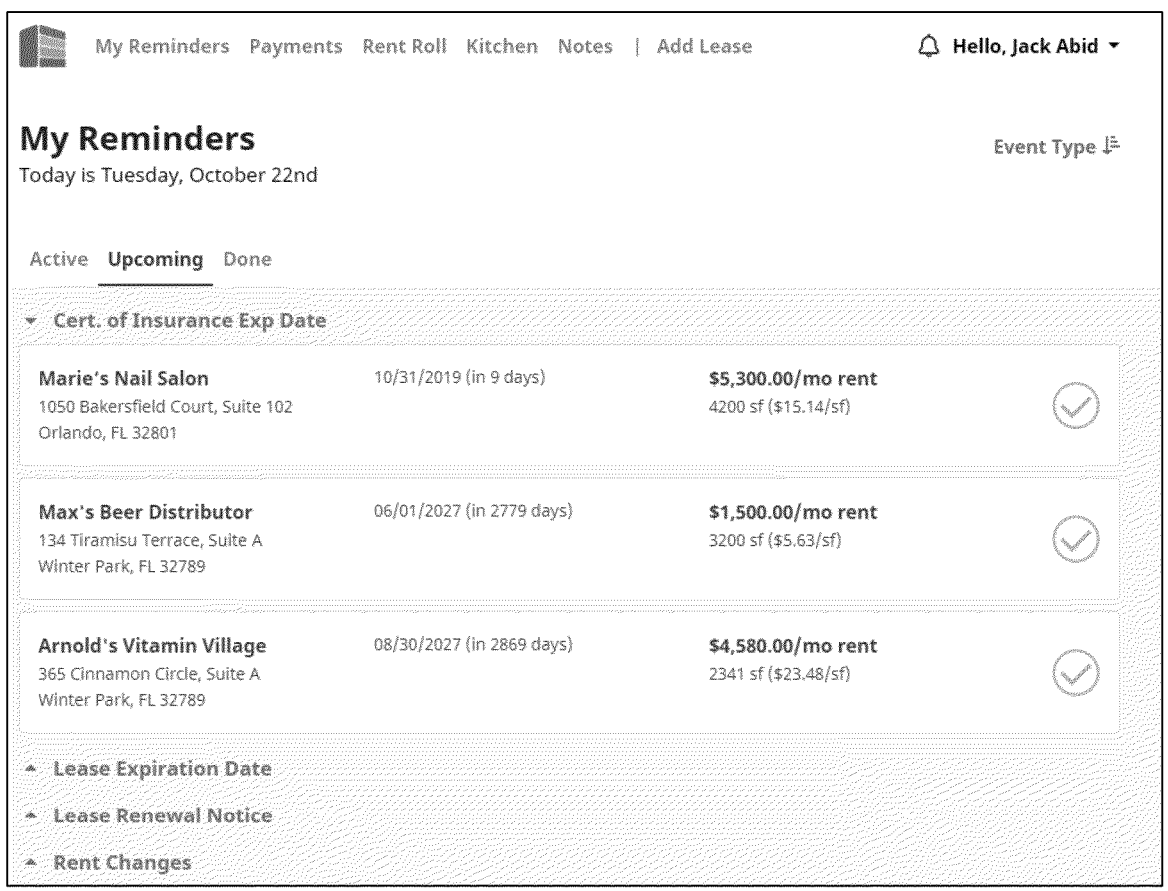
FIGS. 8A-8W are screenshots from an example embodiment of the landlord web interface in the lease management system, according to the present disclosure.
Figure 8B:
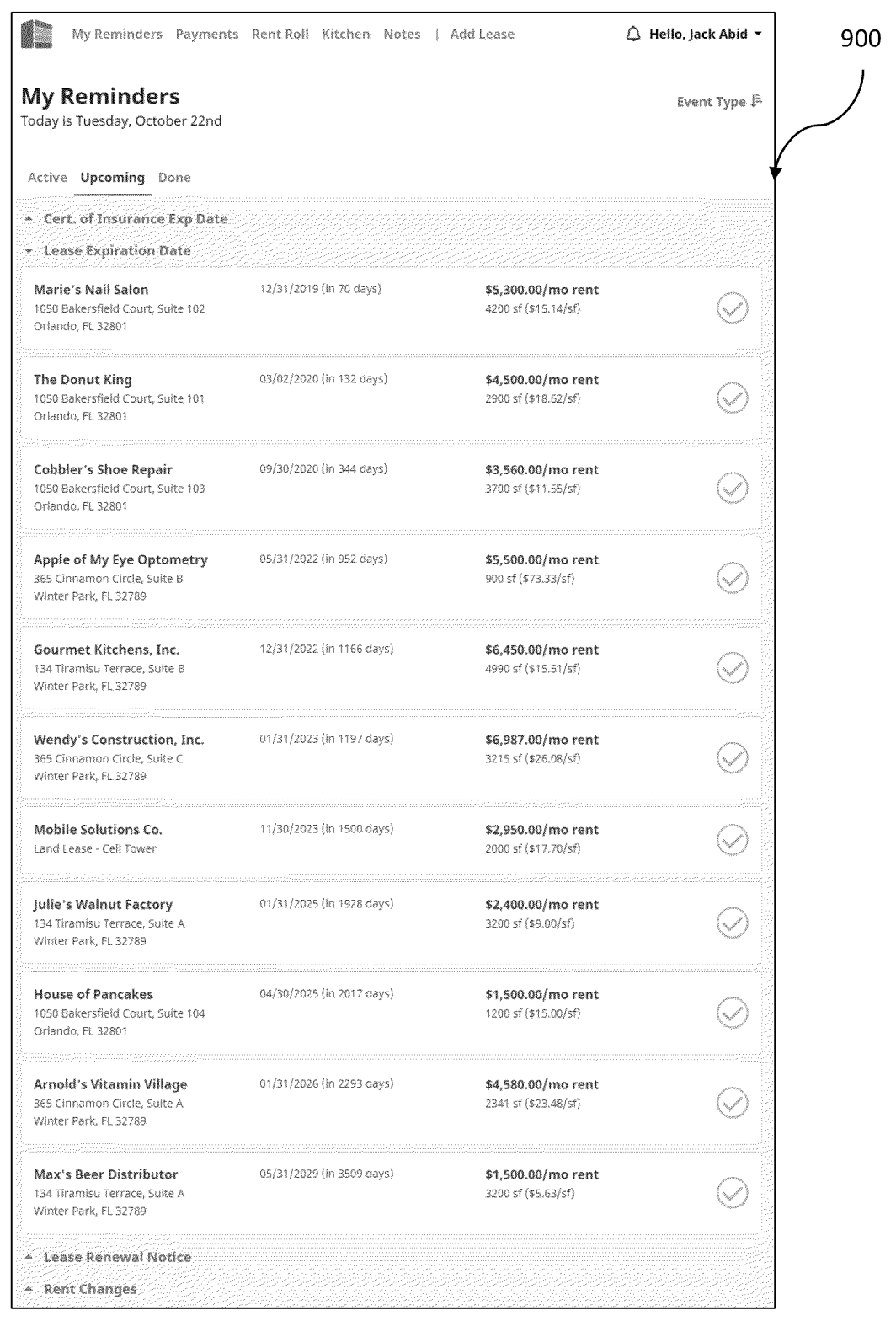
Figure 8C:
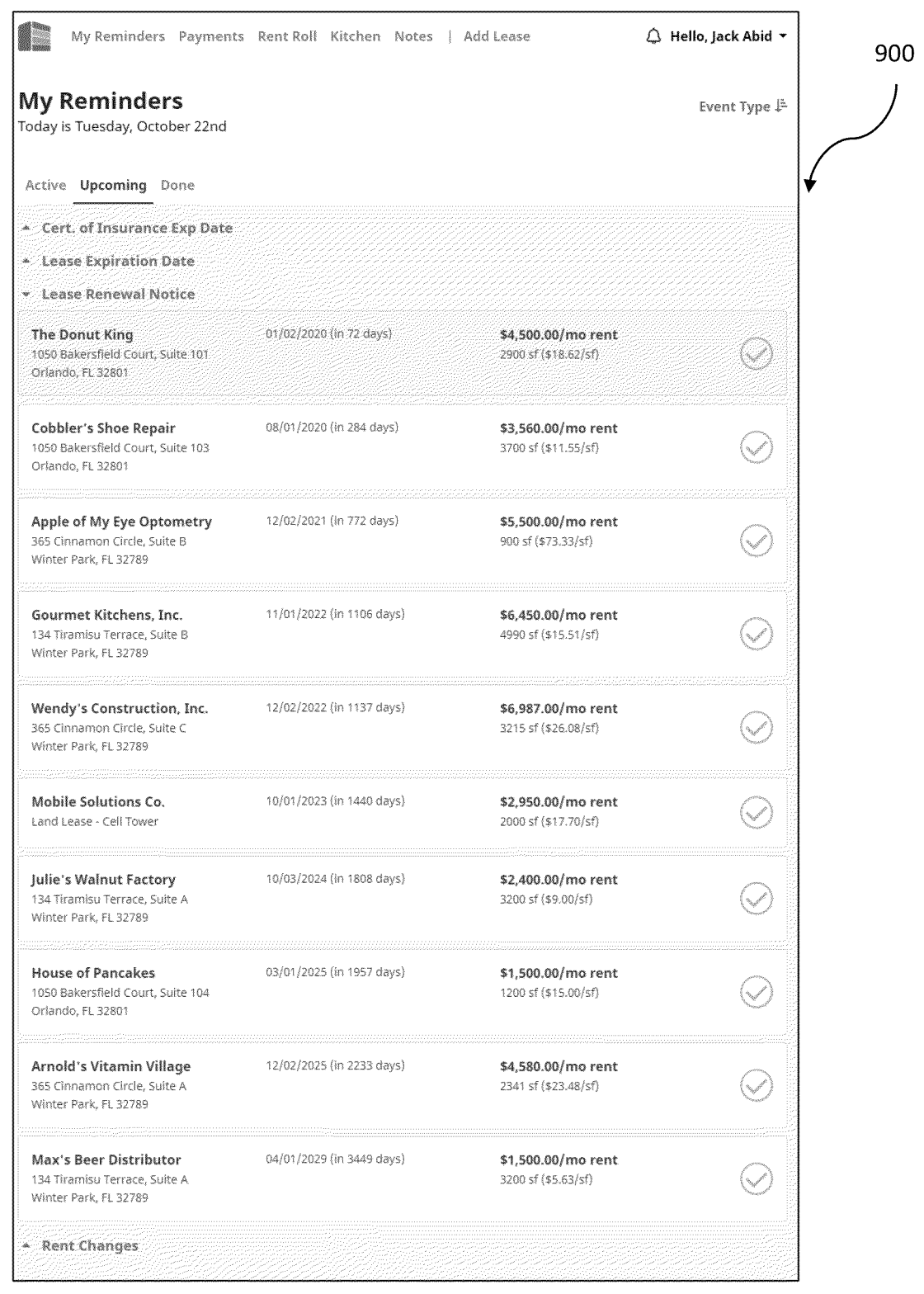
Figure 8D:
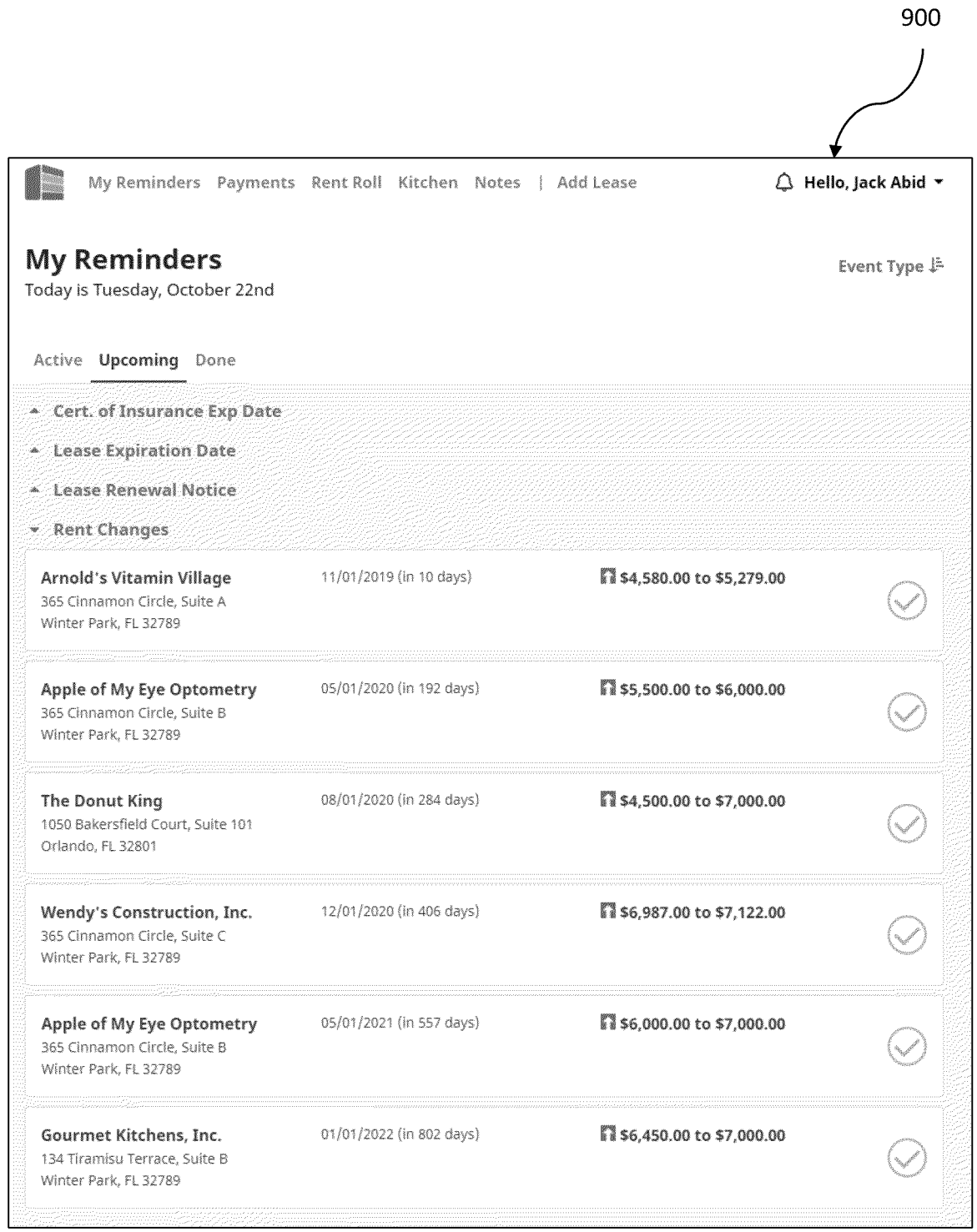
Figure 8E:
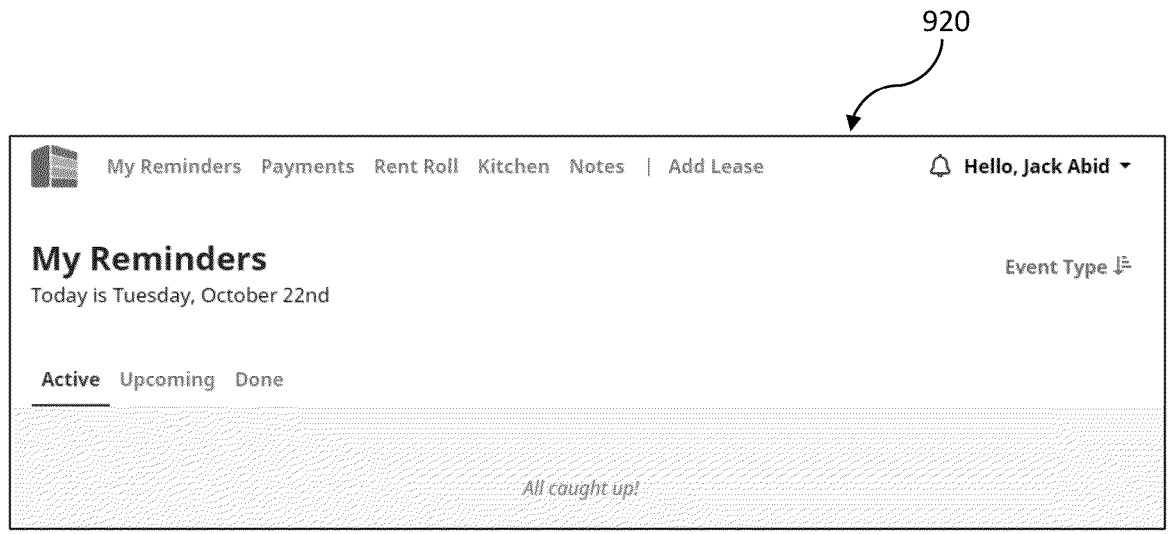
Figure 8F:
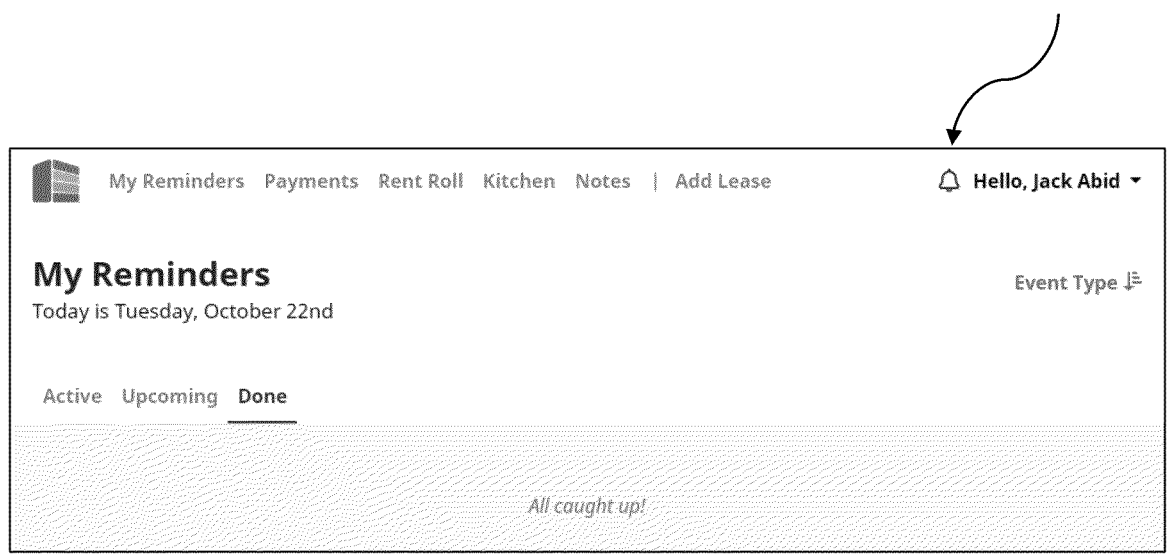
Figure 8G:
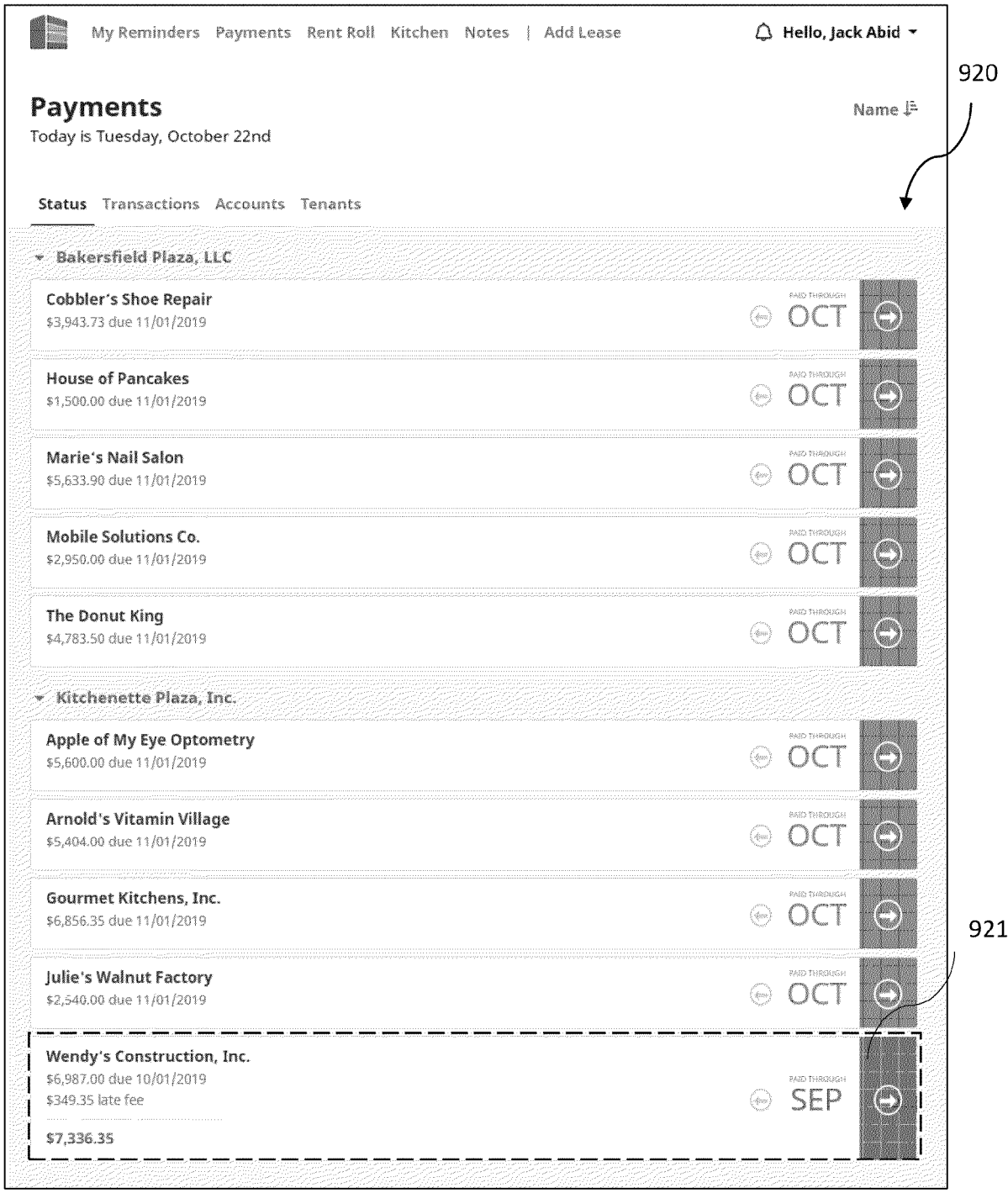

In FIGS. 8A-8D, a reminders interface 900 of the landlord web interface 136a is shown and illustratively includes an upcoming reminders tab showing certificate of insurance expiration dates, lease expiration dates, lease renewal notices, and scheduled rent changes for the respective landlord user 140. FIGS. 8E and 8F respectively show active reminder and completed reminder tabs for the landlord web interface 136a.

Moreover, as event due dates approach, the landlord web interface 136a illustratively includes a notification interface 910 (FIGS. 8D-A) to provide an integrated interface for the landlord user 140. In addition, as shown in FIGS. 8D-B, the server 131 is configured to send out email 915 reminders to the landlord user 140 based upon the notifications.

In FIGS. 8G-8J, a payment interface 920 of the landlord web interface 136a is shown and illustratively includes a status tab (FIG. 8G) showing a current status interface of properties associated with the landlord user 140. The current status interface illustratively comprises a listing of all properties and their lease payment status, and an indicator 921 for properties in a past due status.

Figure 8H:
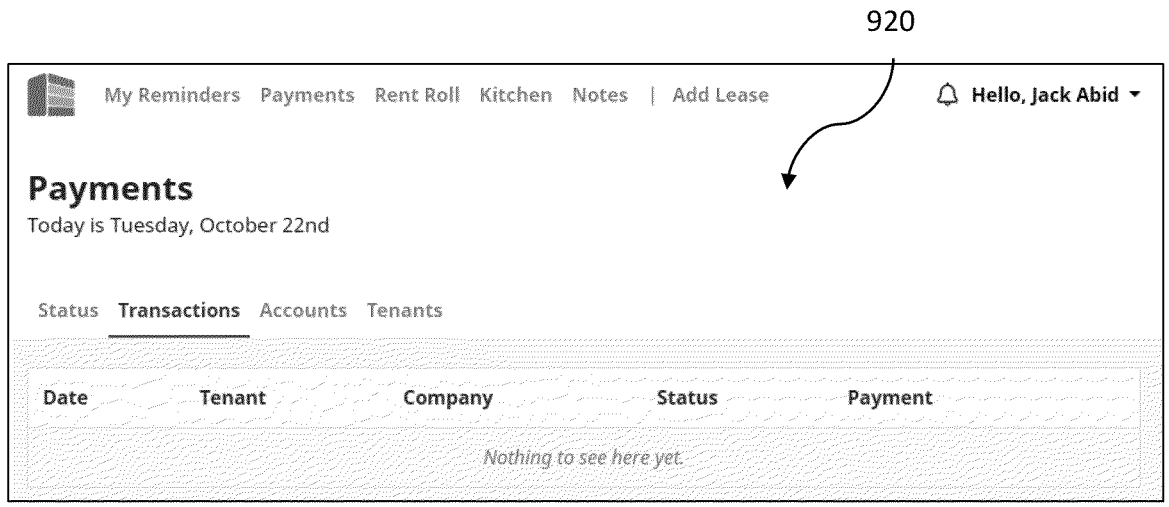
Figure 8I:
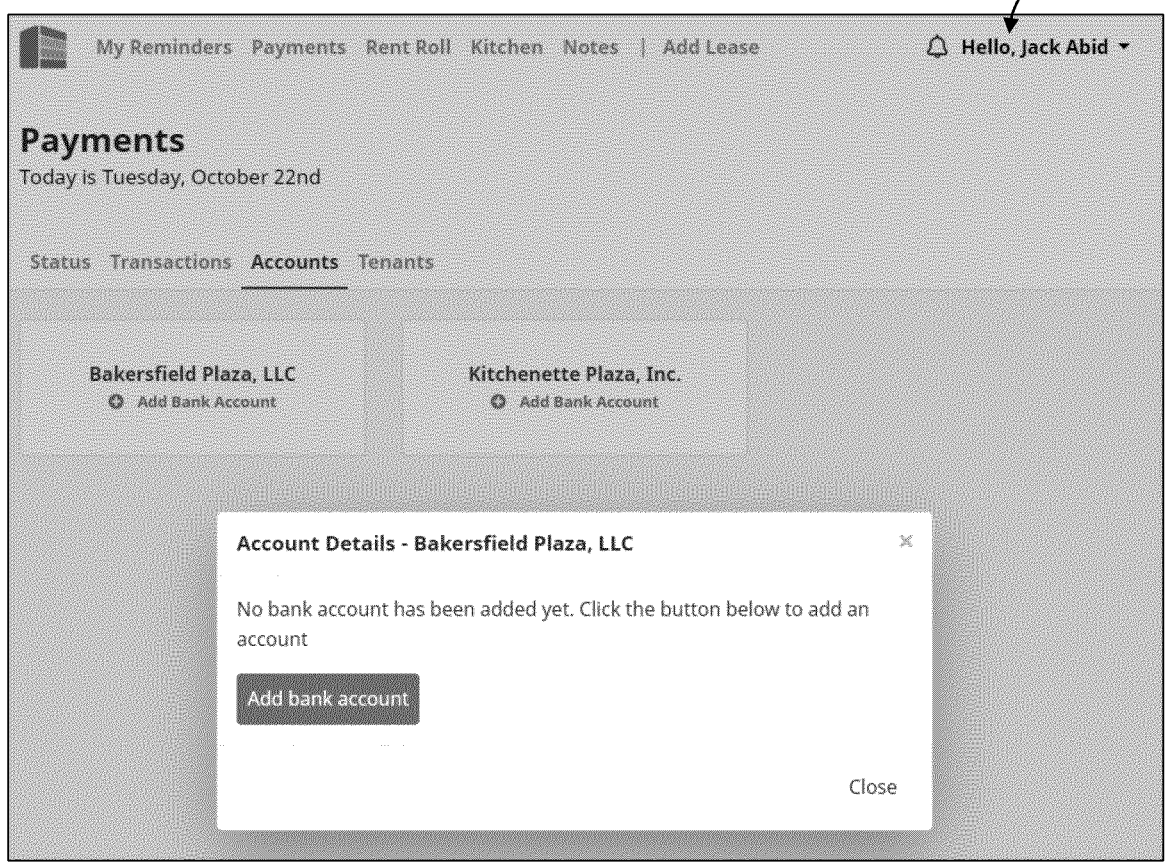
Figure 8J:
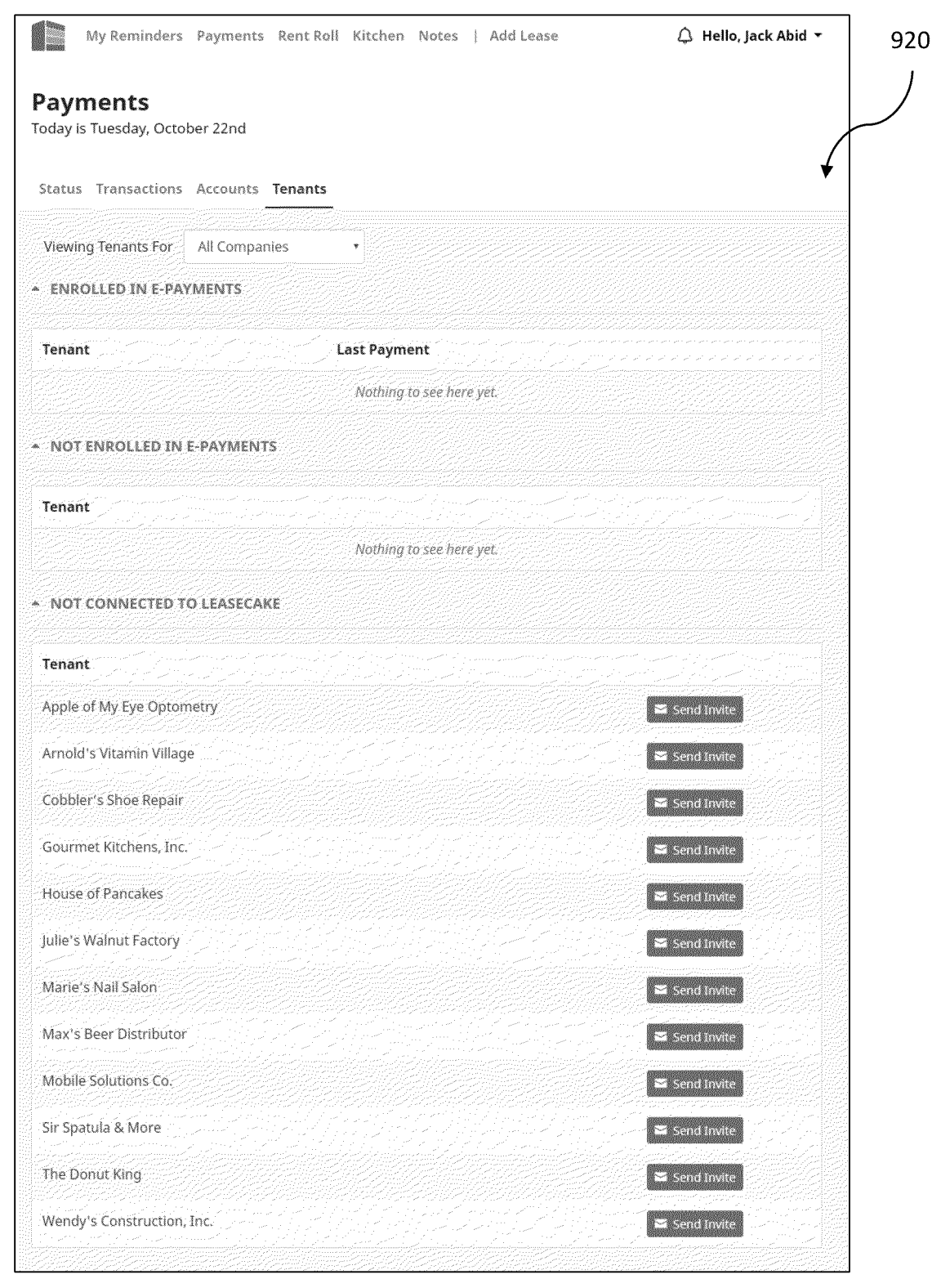
Figure 8K:
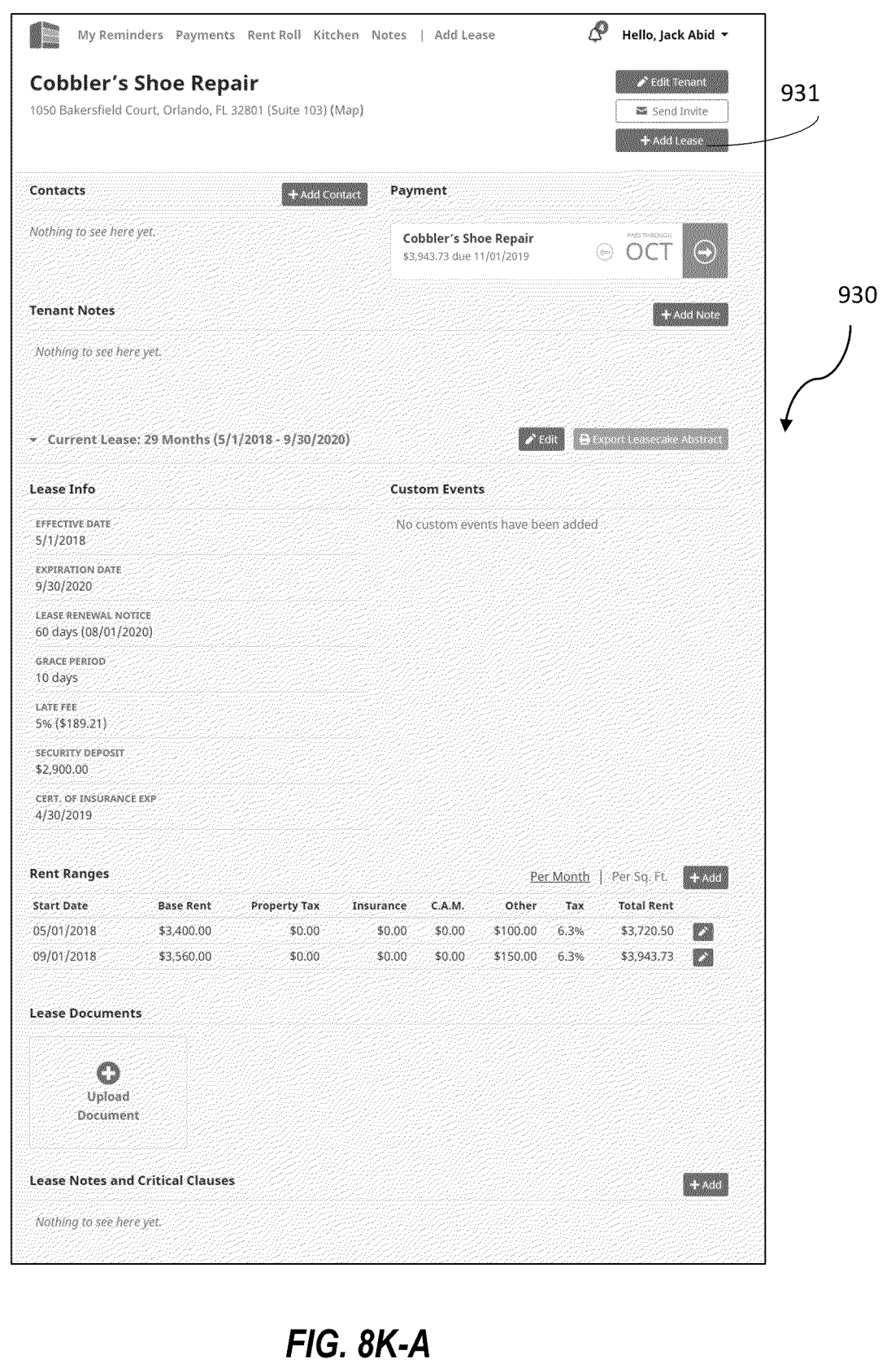
Figure 8L:
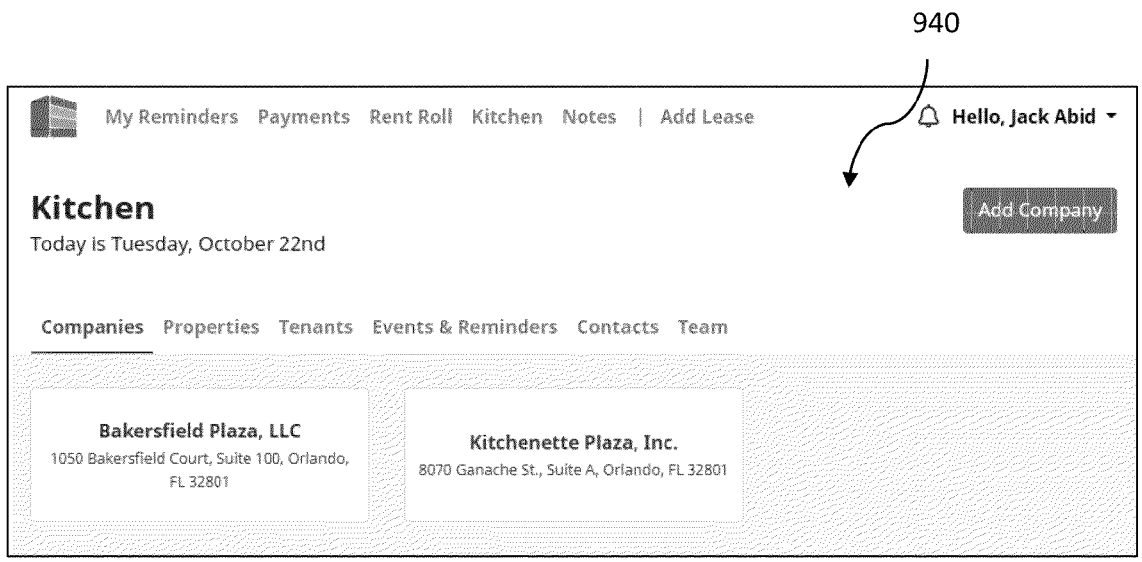
Figure 8M:
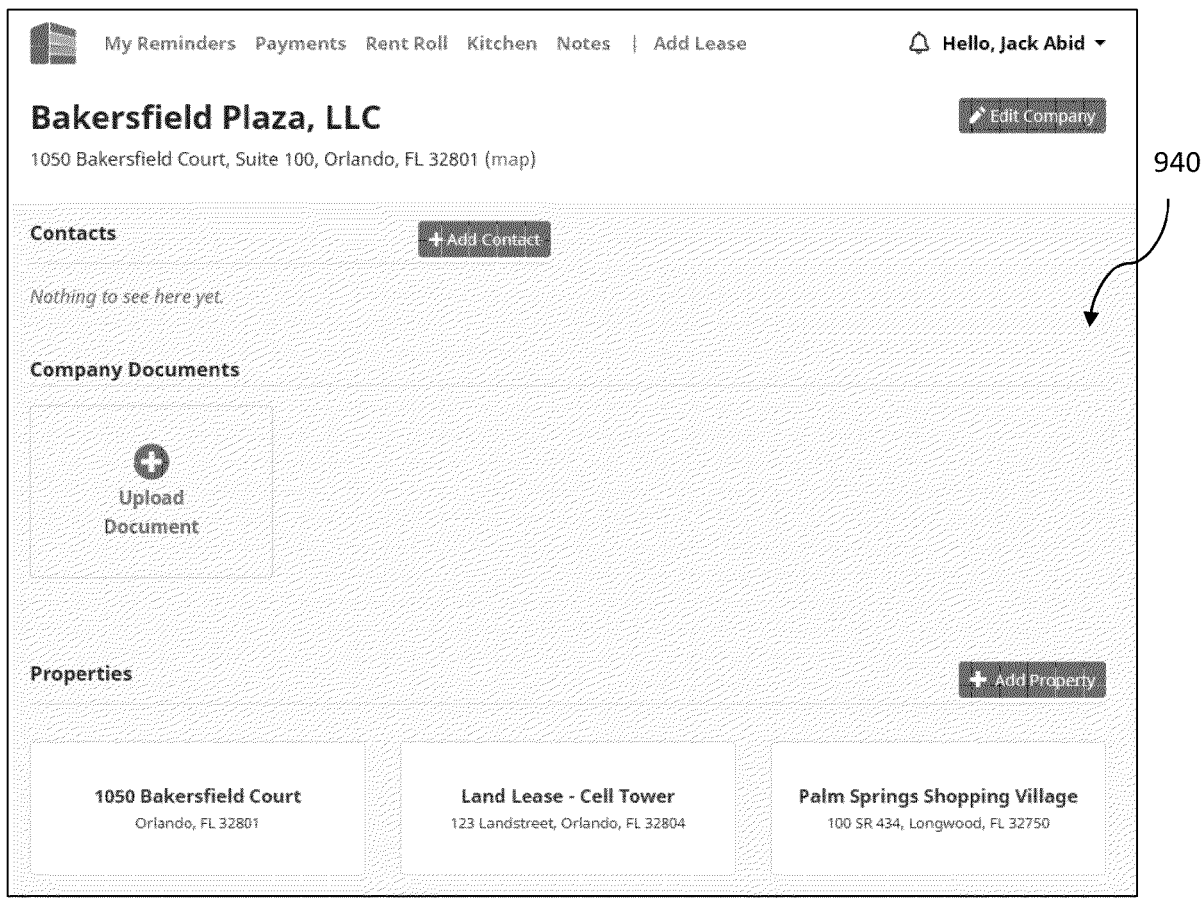
Figure 8N:
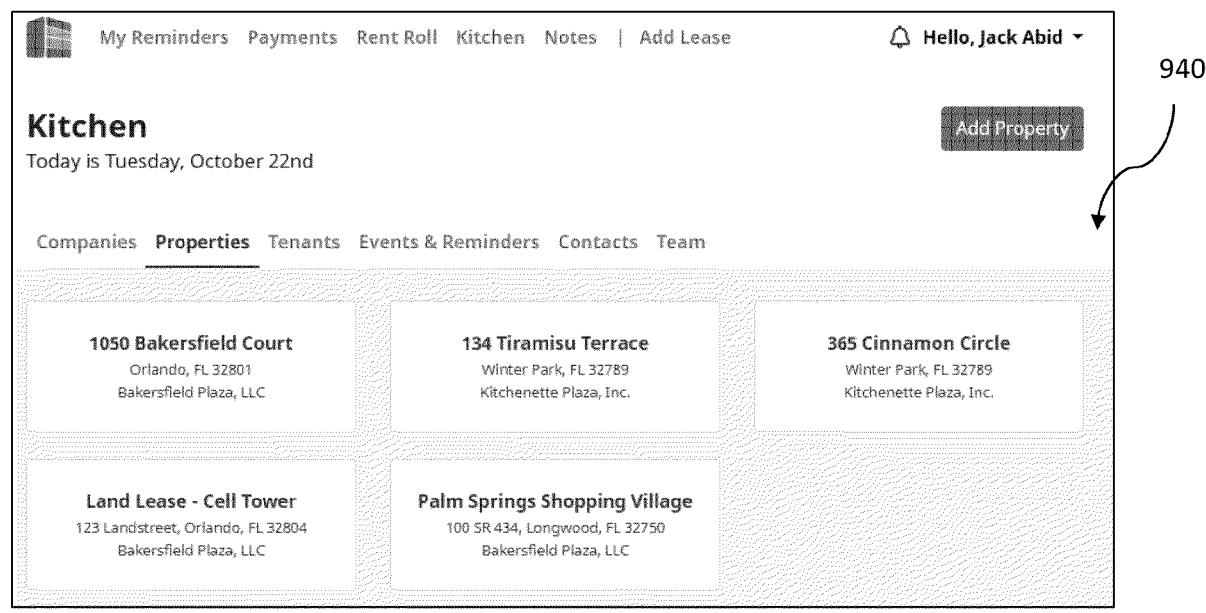
Figure 8O:
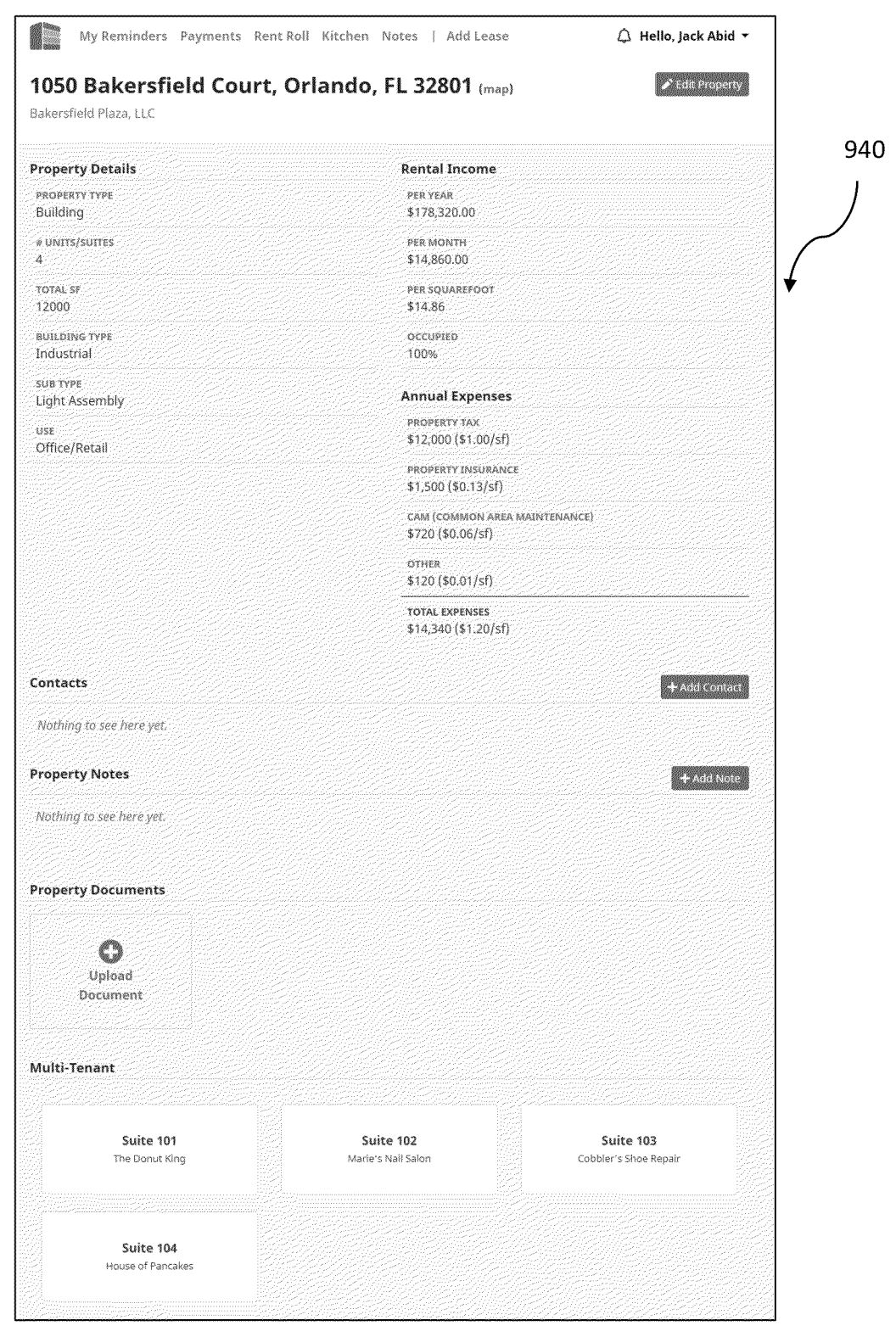
Figure 8P:
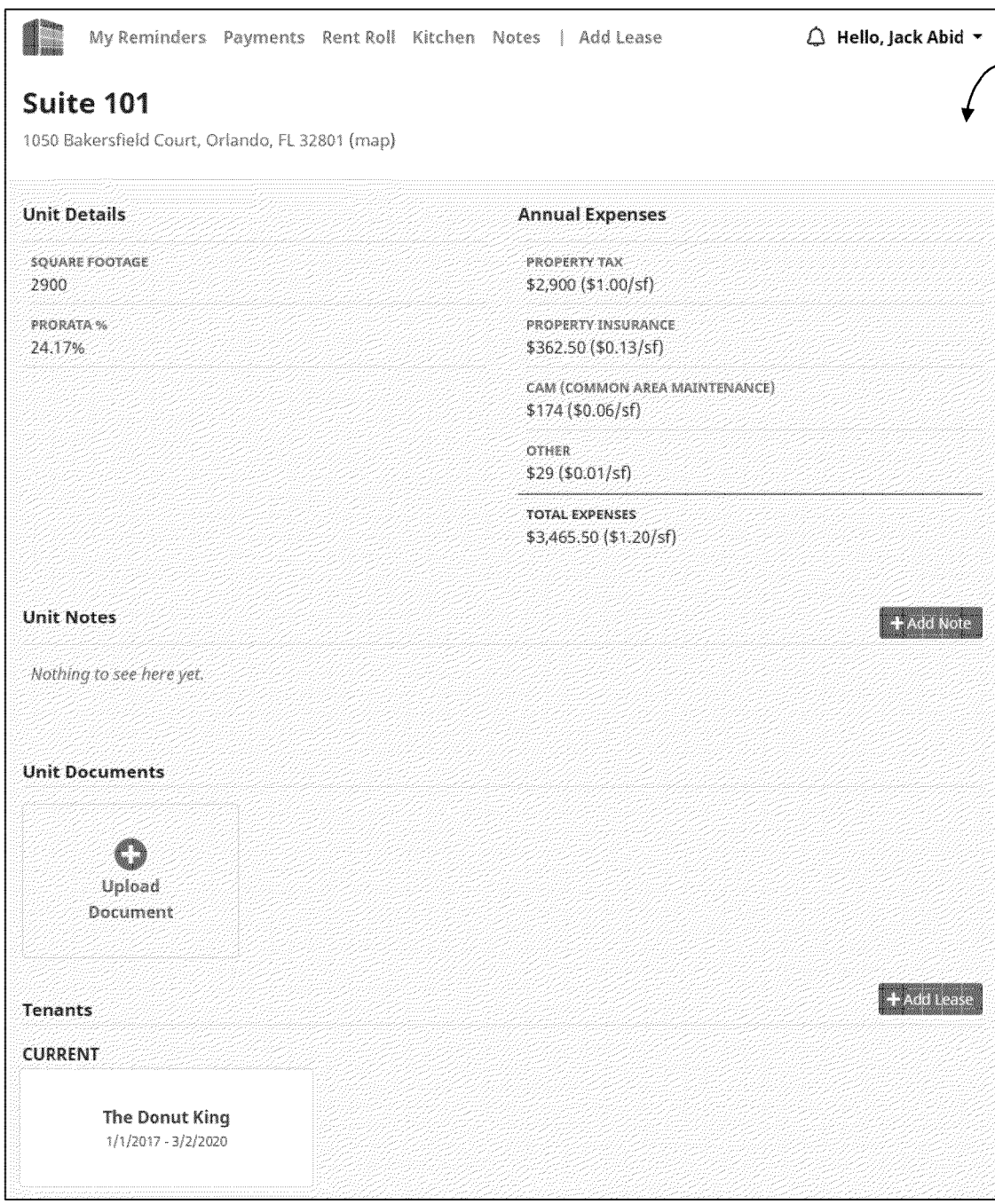
Figure 8Q:
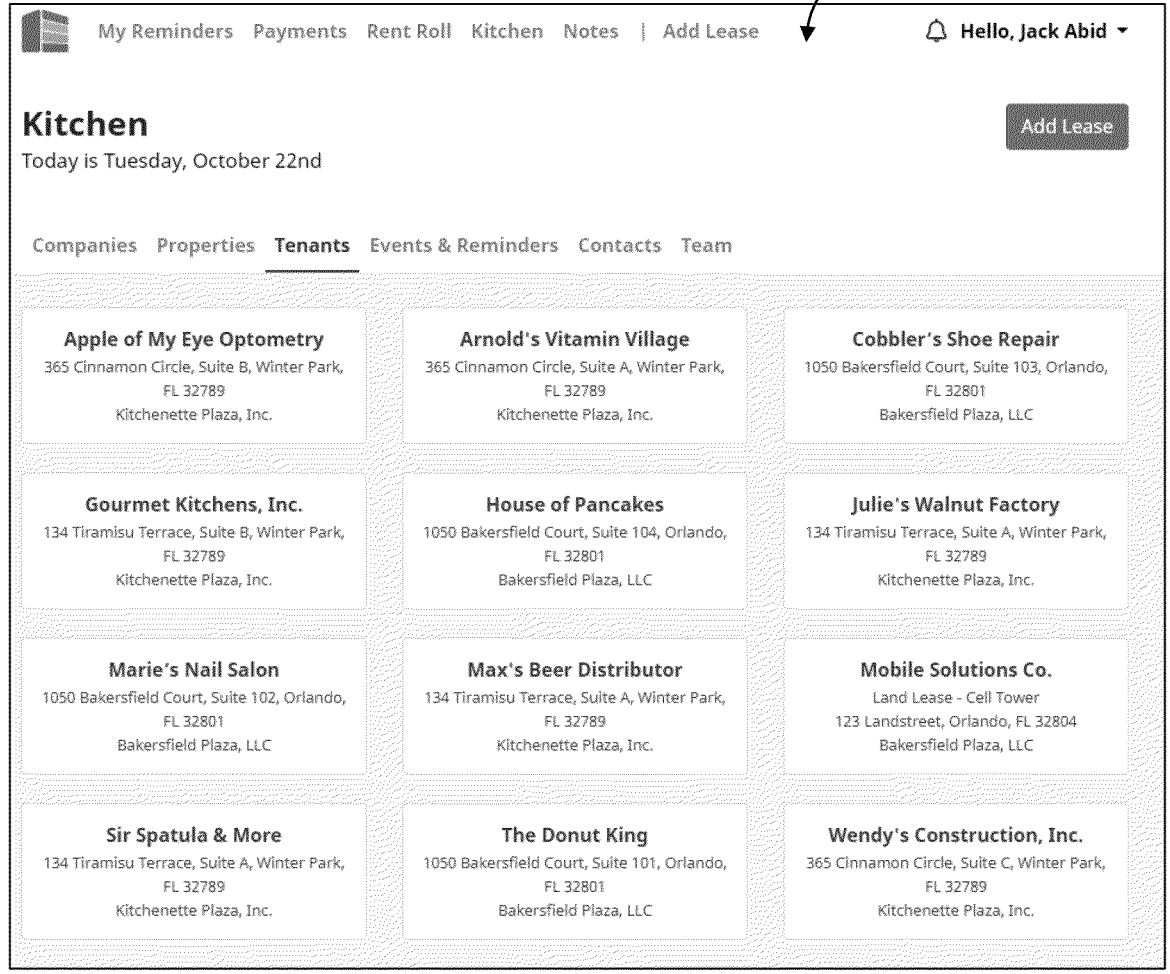
Figure 8R:
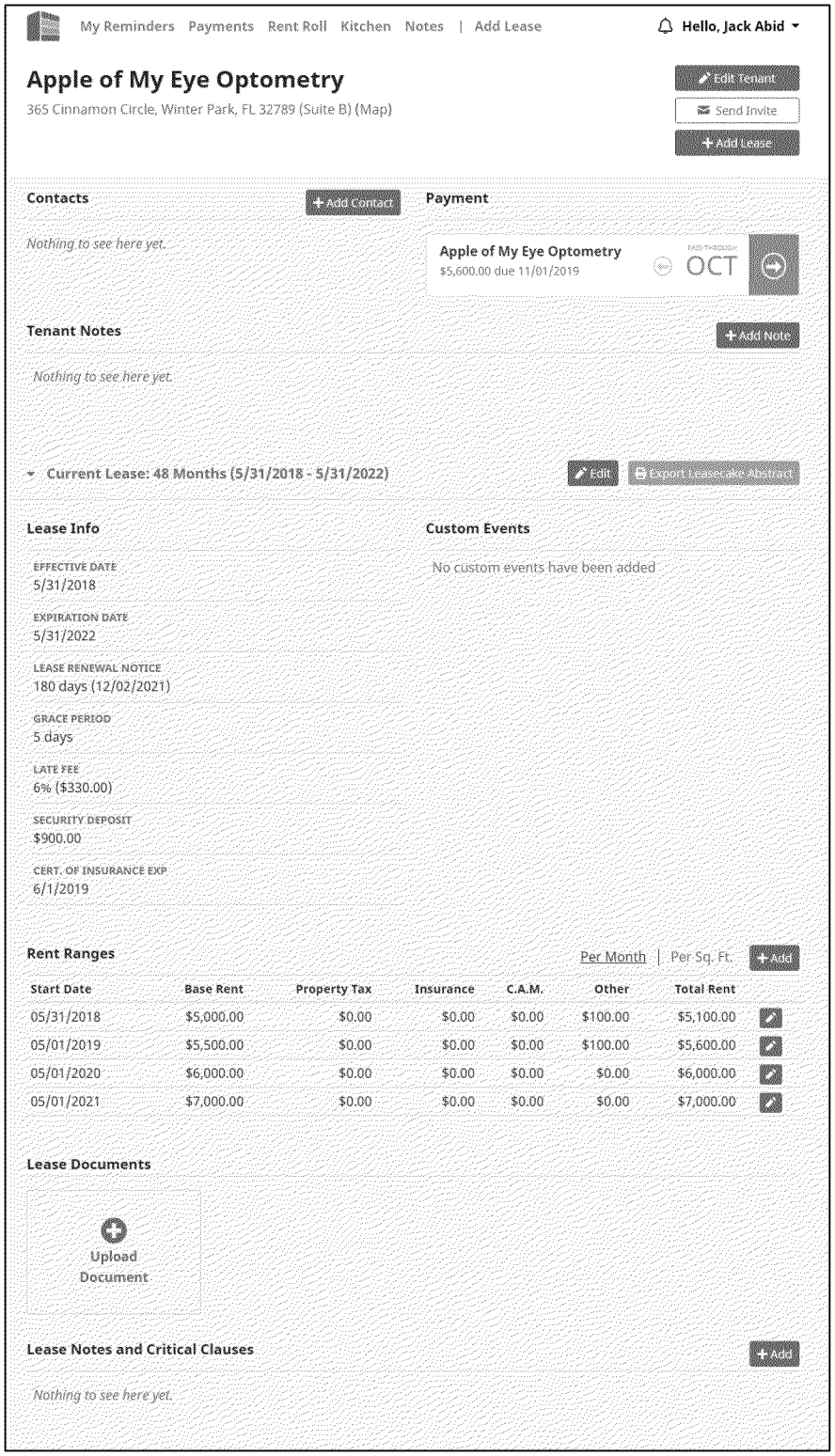
Figure 8S:
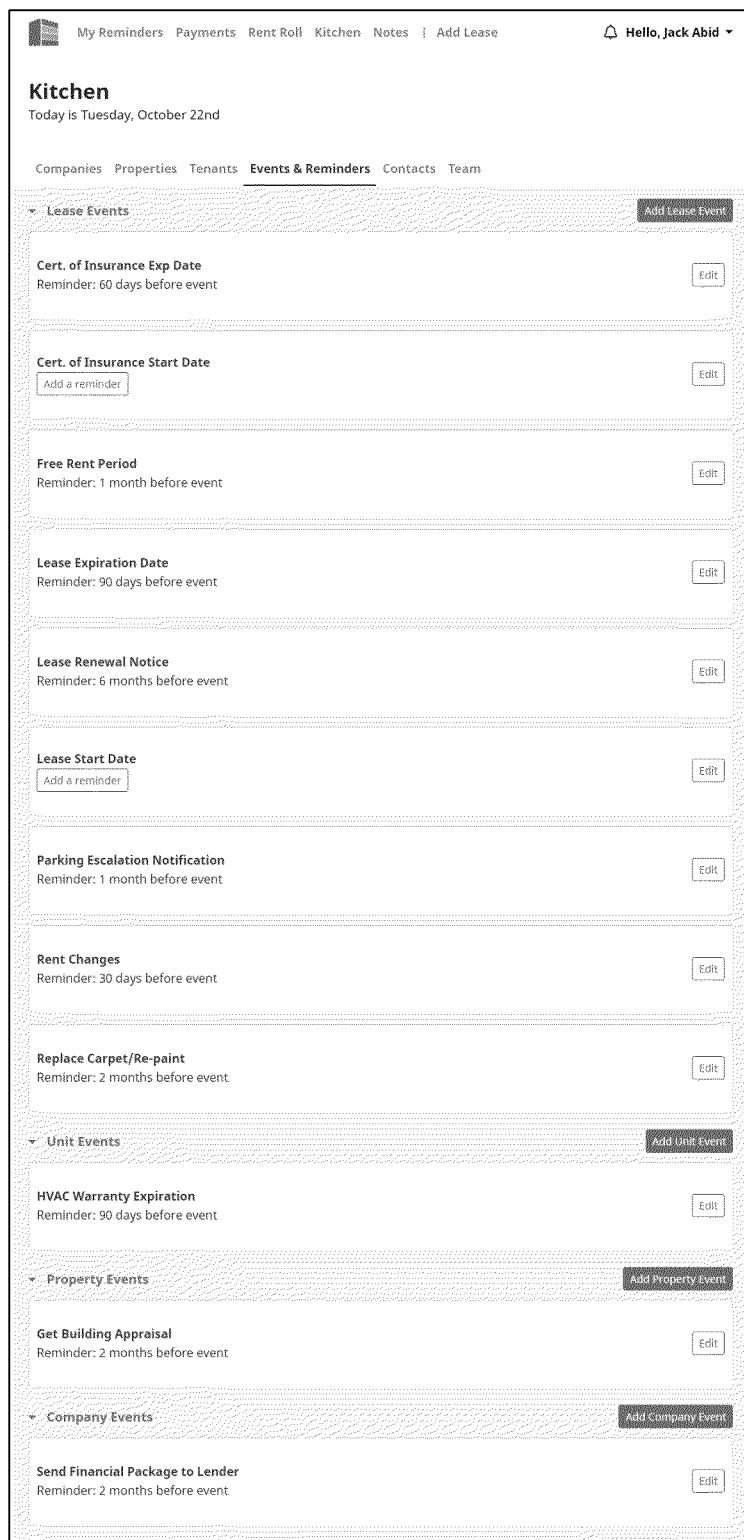
Figure 8T:
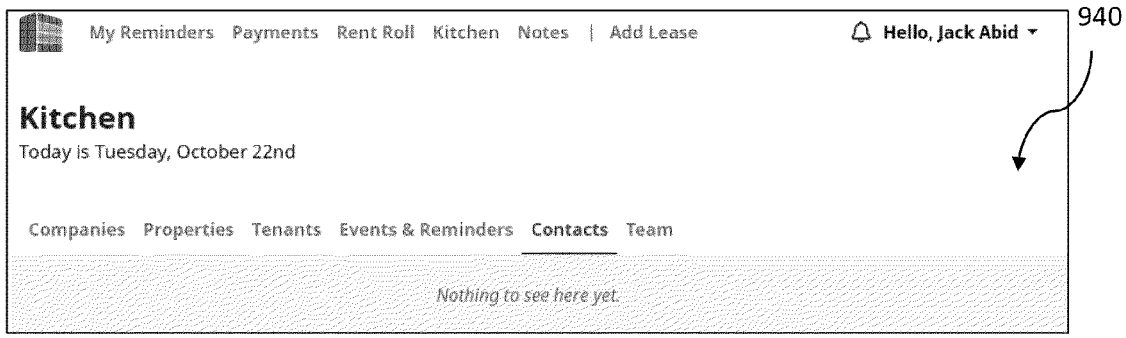

FIGS. 8H-8J respectively show the transactions tab, accounts tab, and tenants tab. In FIG. 8K, a rent roll interface 930 of the landlord web interface 136*a* is shown and illustratively includes a chronological timeline of scheduled payments updated in real time for the landlord user 140.

In FIGS. 8L-8U, the kitchen interface 940 of the landlord web interface 136*a* is shown and illustratively includes a companies tab (FIG. 8L) showing a listing of companies associated with the landlord user 140.

FIGS. 8H-8J respectively show the transactions tab, accounts tab, and tenants tab. Within the tenants tab, the user has the opportunity to send email invites to the associated parties to join the lease management marketplace social network 137.

In FIG. 8K, the rent roll interface 930 is shown, and illustratively includes a listing of current tenants for the respective landlord user 140. As shown in FIGS. 8K-A, the user may click through on each item in the rent roll interface 930 to seek detailed information on the tenant and property. In FIGS. 8K-A, the rent roll interface 930 illustratively includes a document upload interface 931 for adding new documents to the property profile.

Figure 8U:
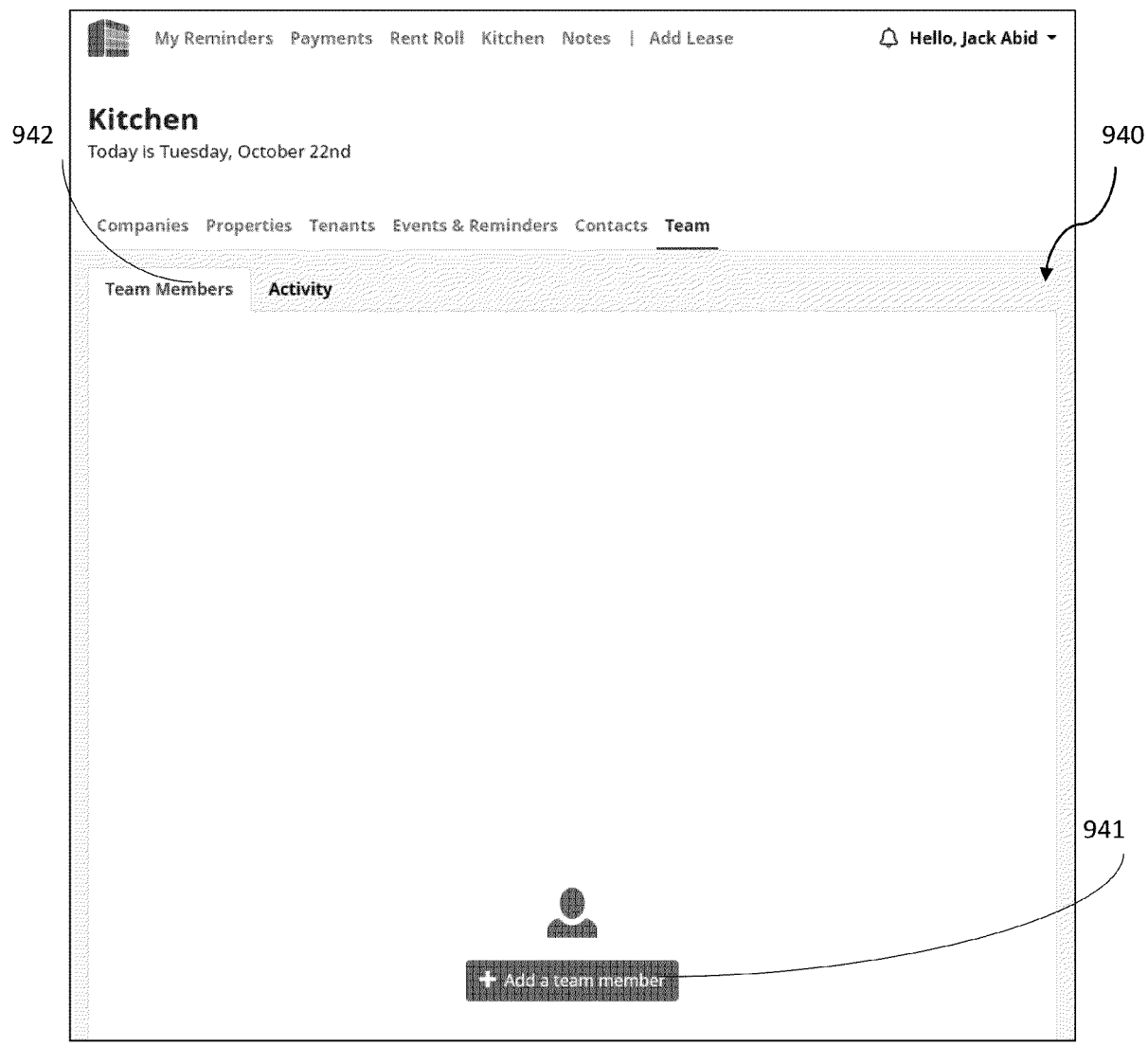

In FIGS. 8L-8U, the kitchen interface 940 is shown, and illustratively includes a companies tab (FIGS. 8L-8M), a properties tab (FIGS. 8N-8P), a tenants tab (FIGS. 8Q-8R), an events and reminders tab (FIG. 8S), a contacts tab (FIG. 8T), and a team tab (FIG. 8U). In FIG. 8U, the interface also illustratively includes a button 941 to add a new team member. As will be appreciated, this team members tab 942 is a proverbial launch point for the landlord user 140 to expand his network of connected users in the lease management marketplace social network 137.

Figure 8W:
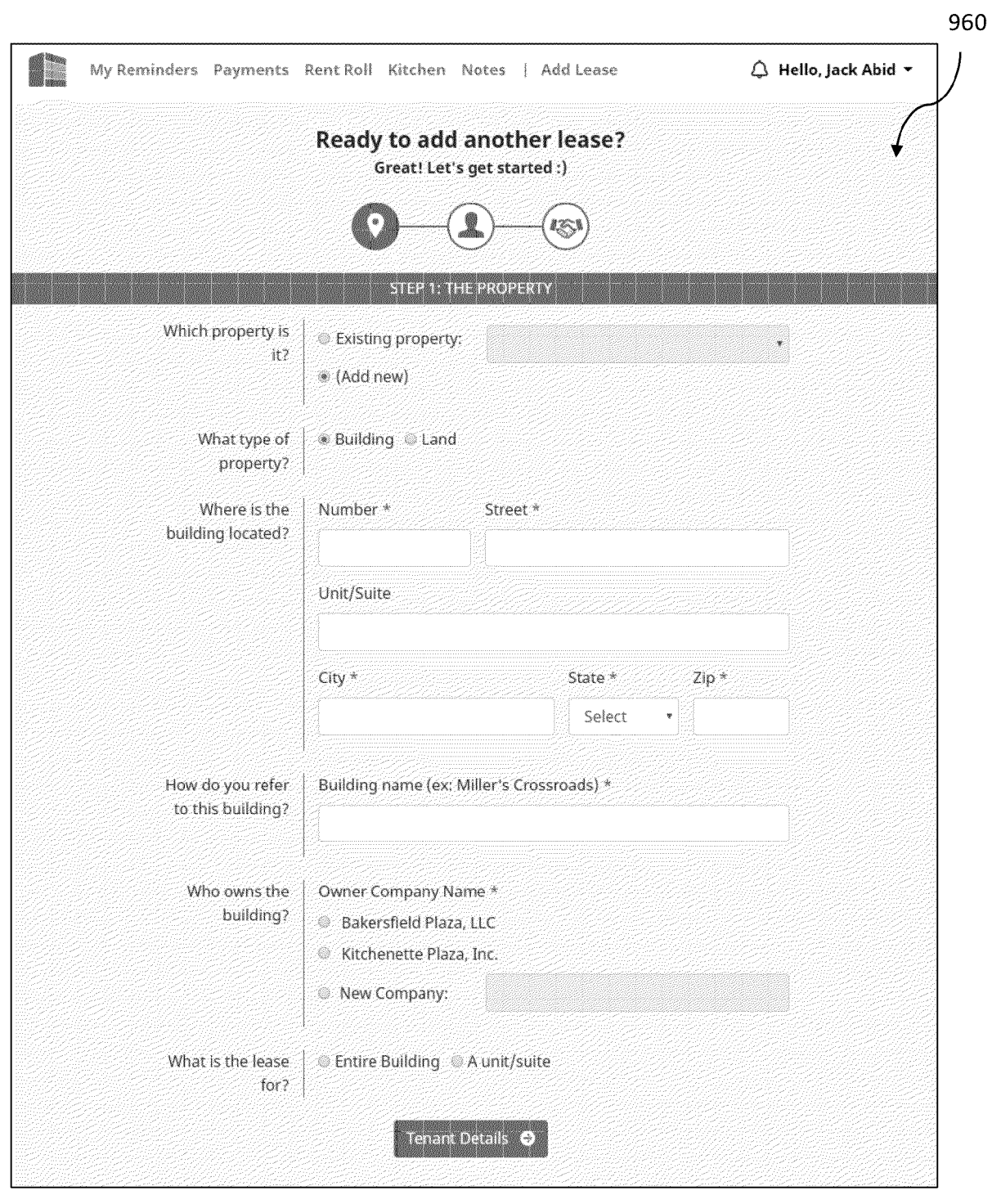

In FIG. 8V, a notes interface 950 is shown, which allows the landlord user 140 to annotate different properties in the system. In FIG. 8W, a new property addition interface 960 is shown, which comprises a plurality of fields for adding properties manually.

Figure 9A:
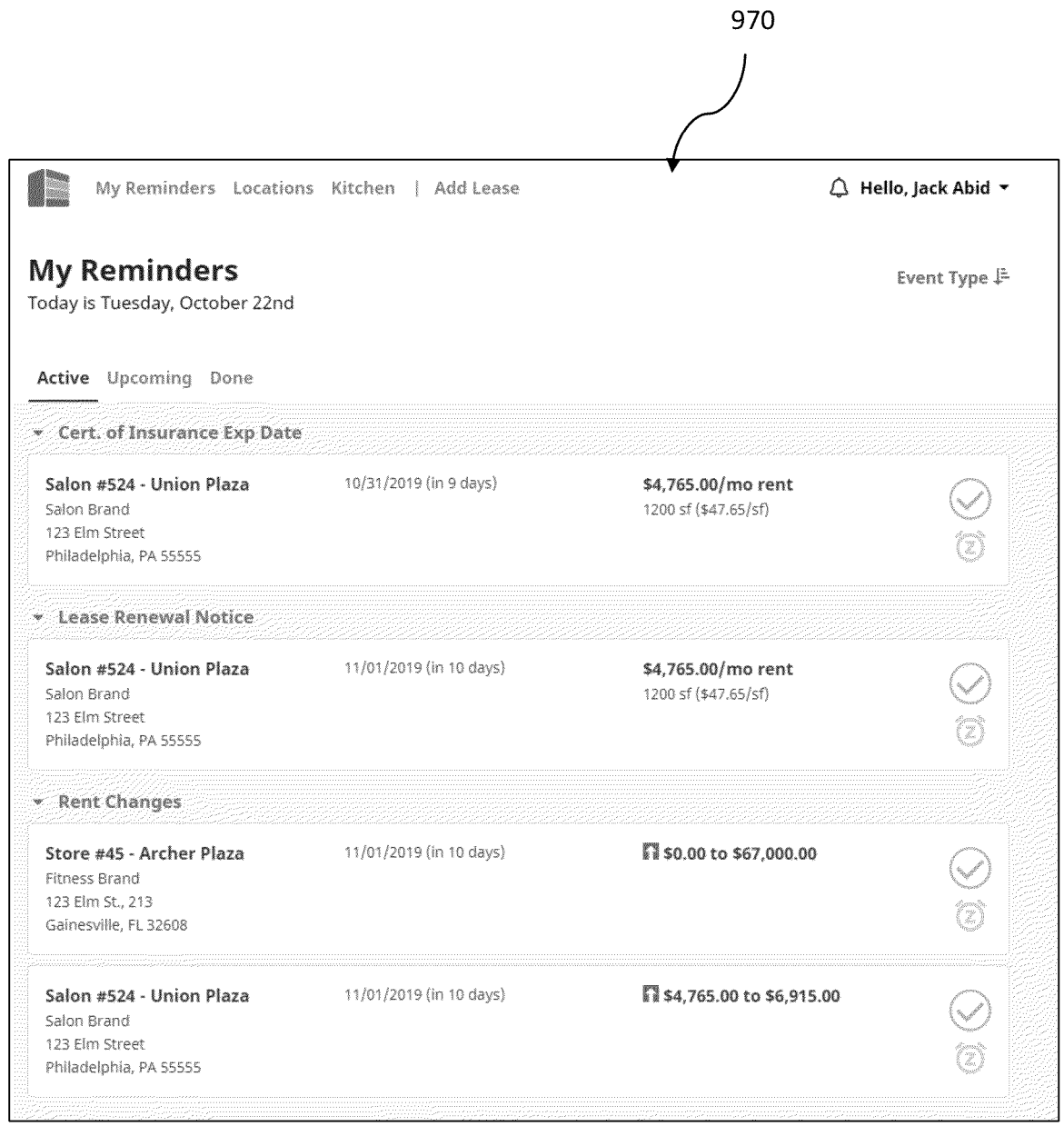
Figure 9B:
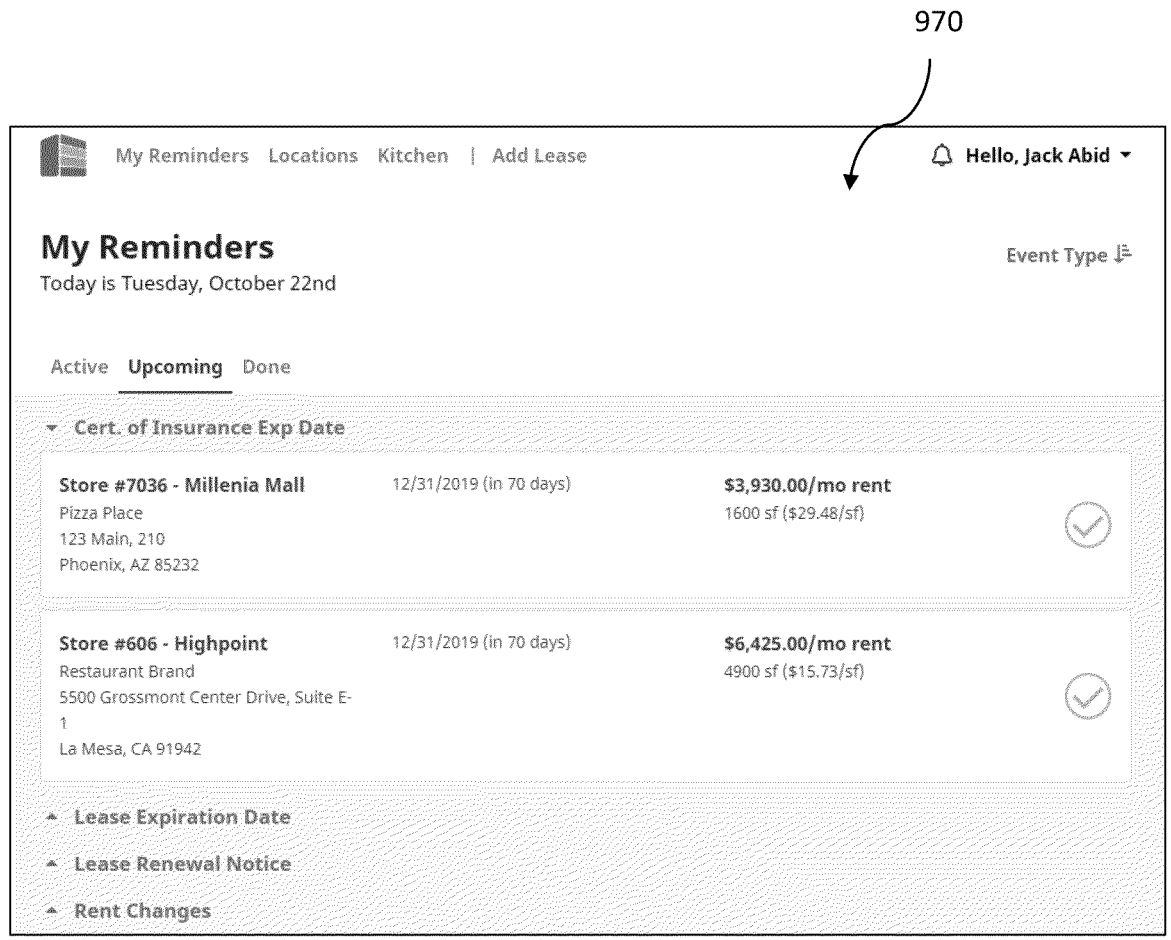
Figure 9C:
Figure 9D:
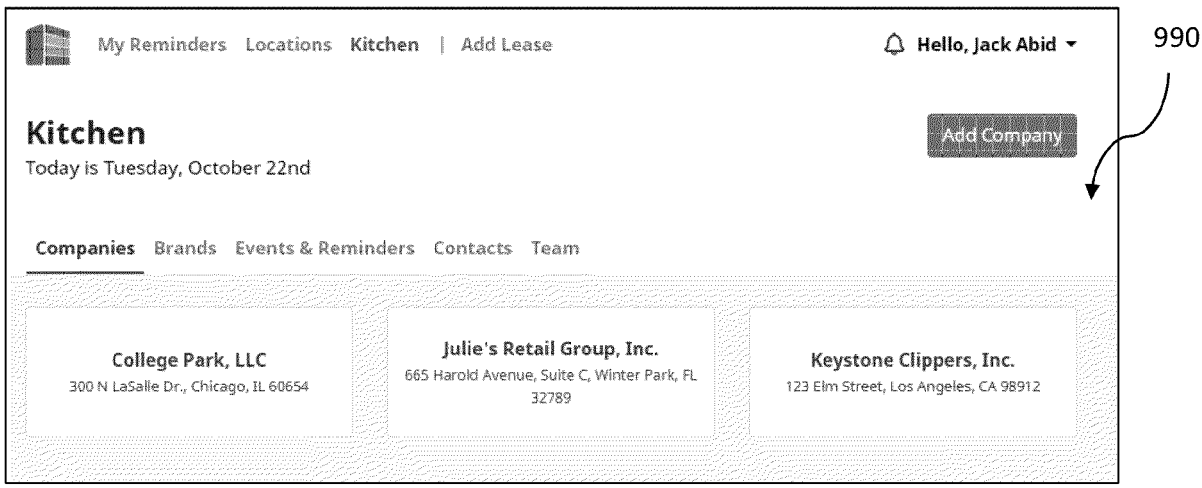
Figure 9E:
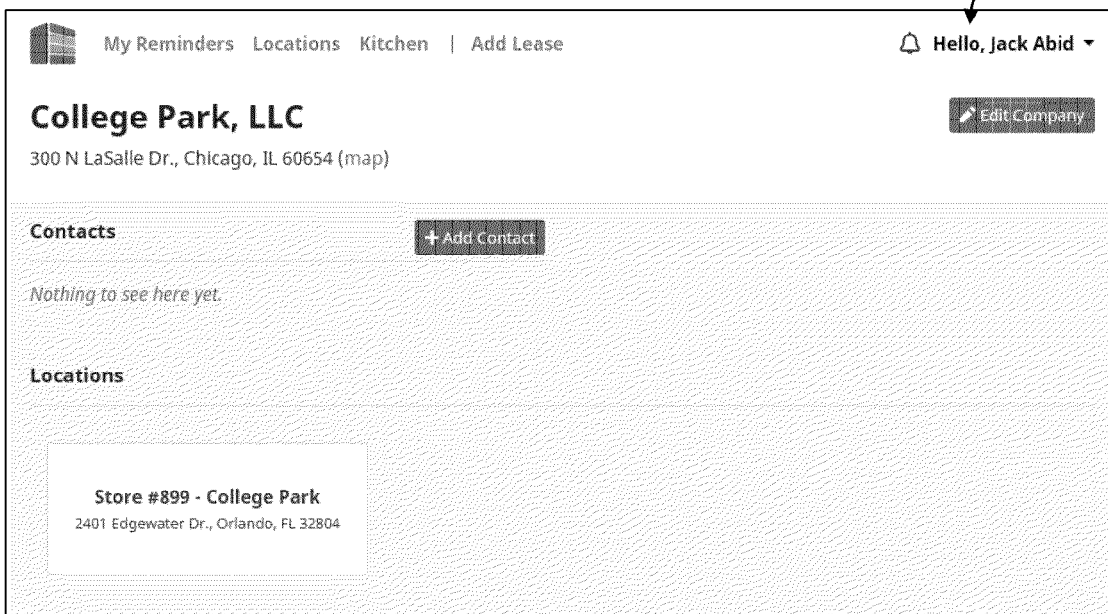
Figure 9F:
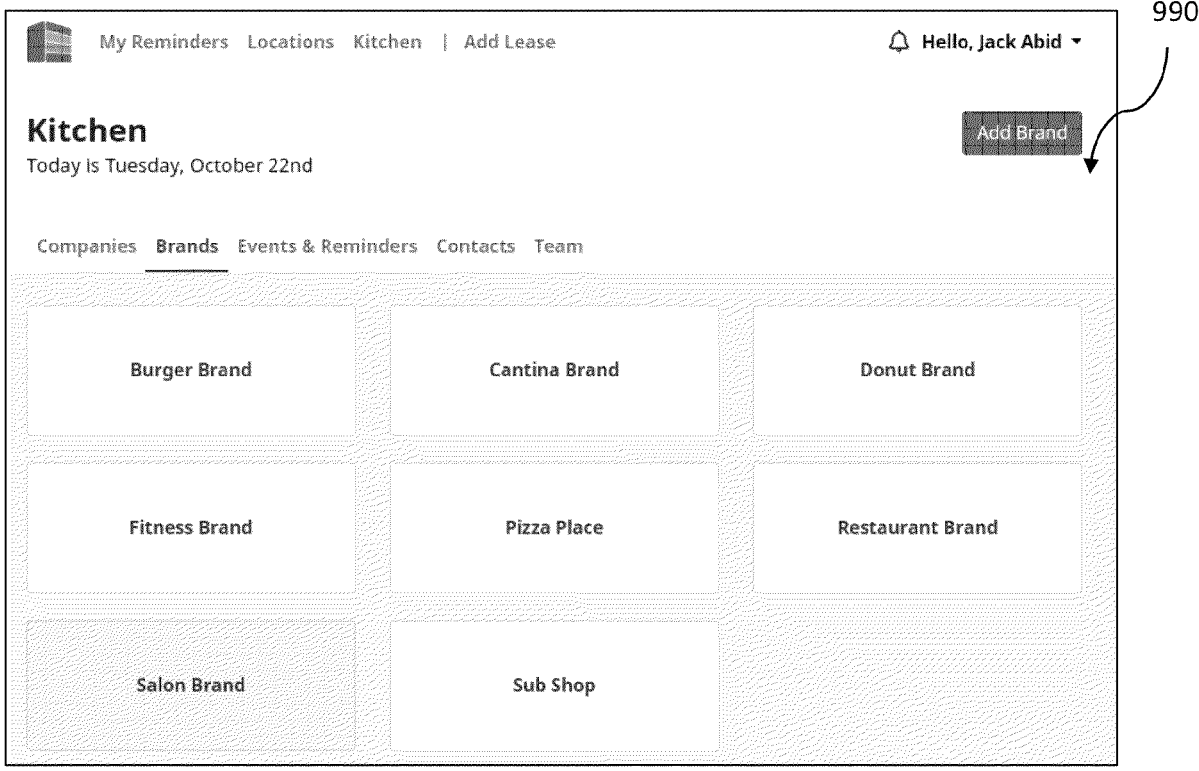
Figure 9G:
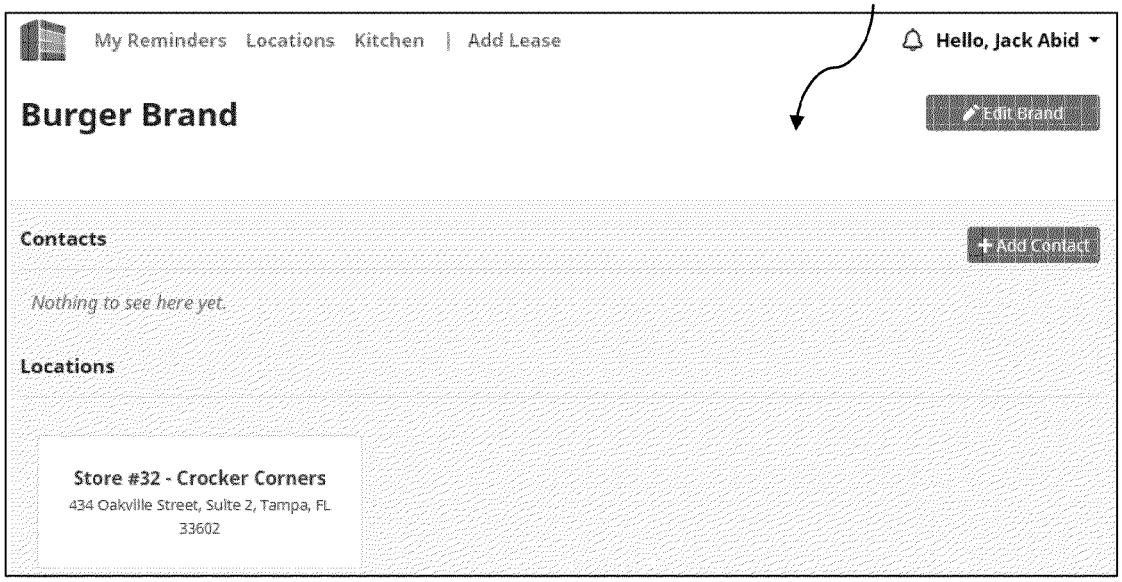
Figure 9H:
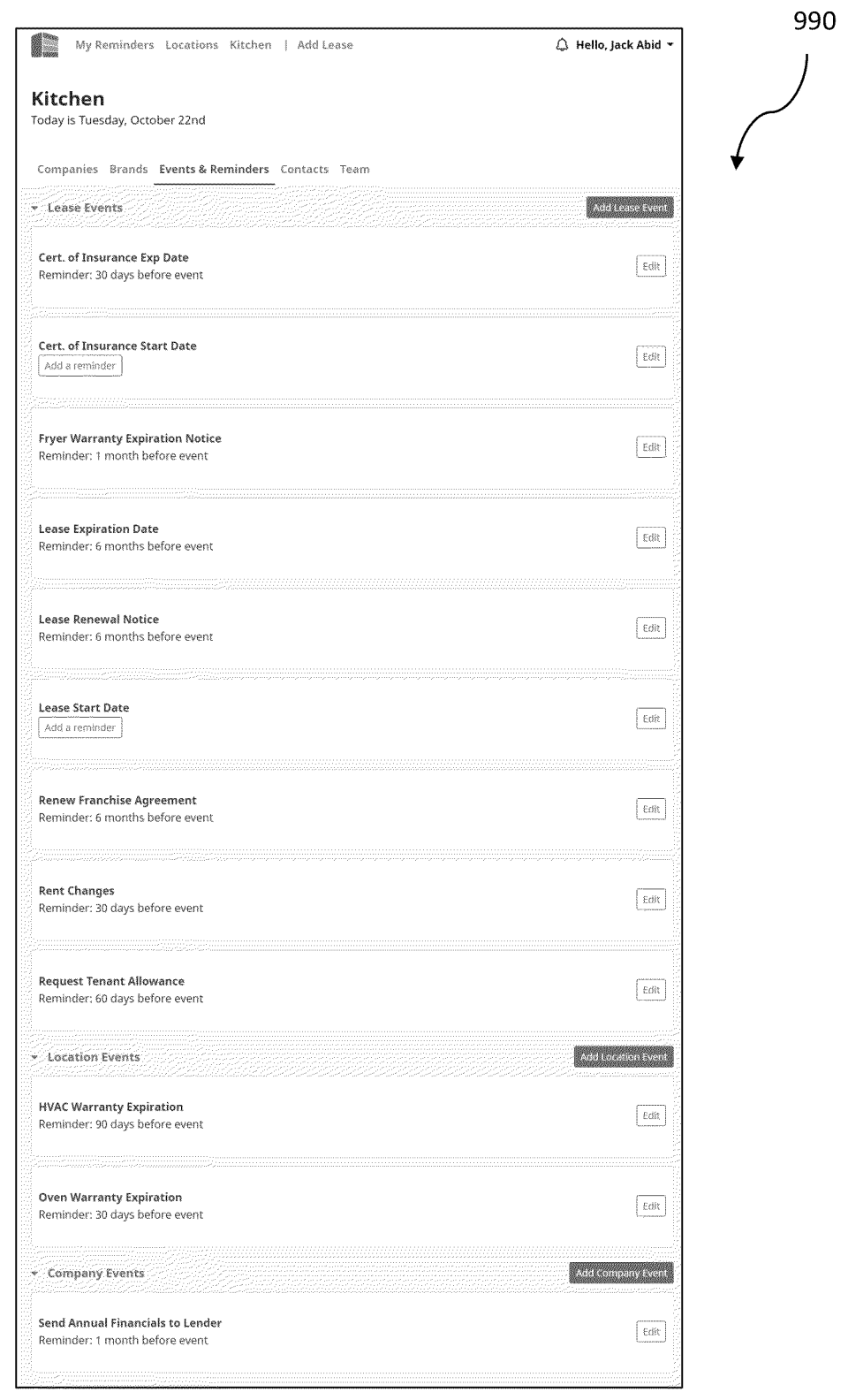
Figure 9I:
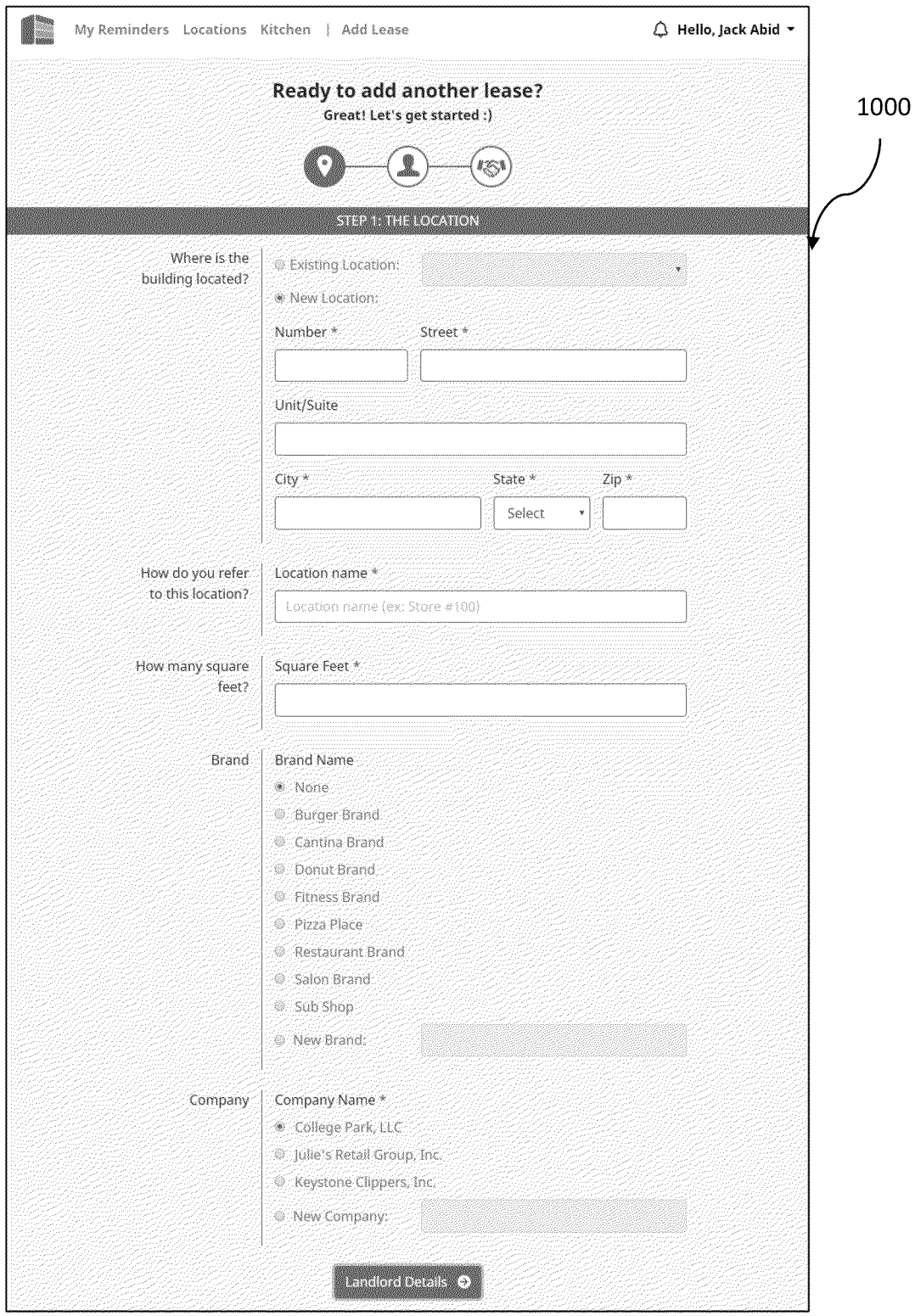
Figure 9J:
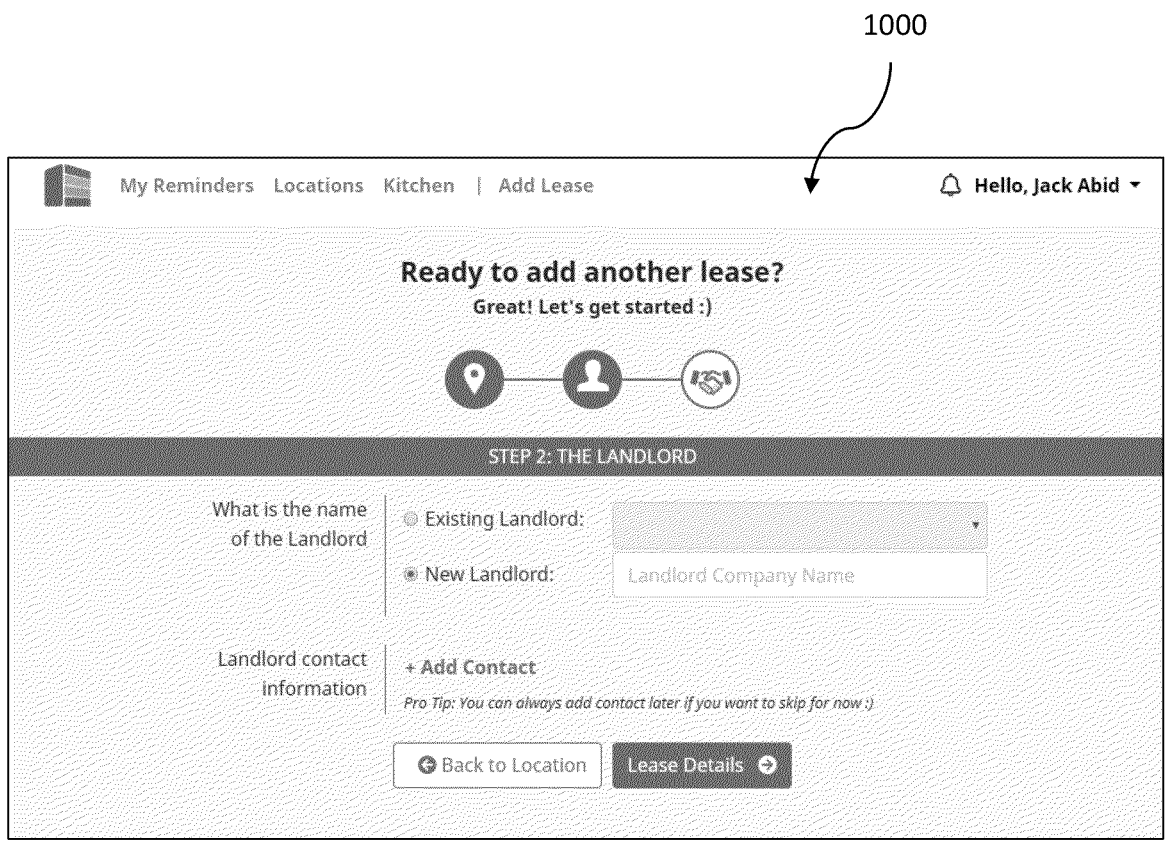
Figure 9K:
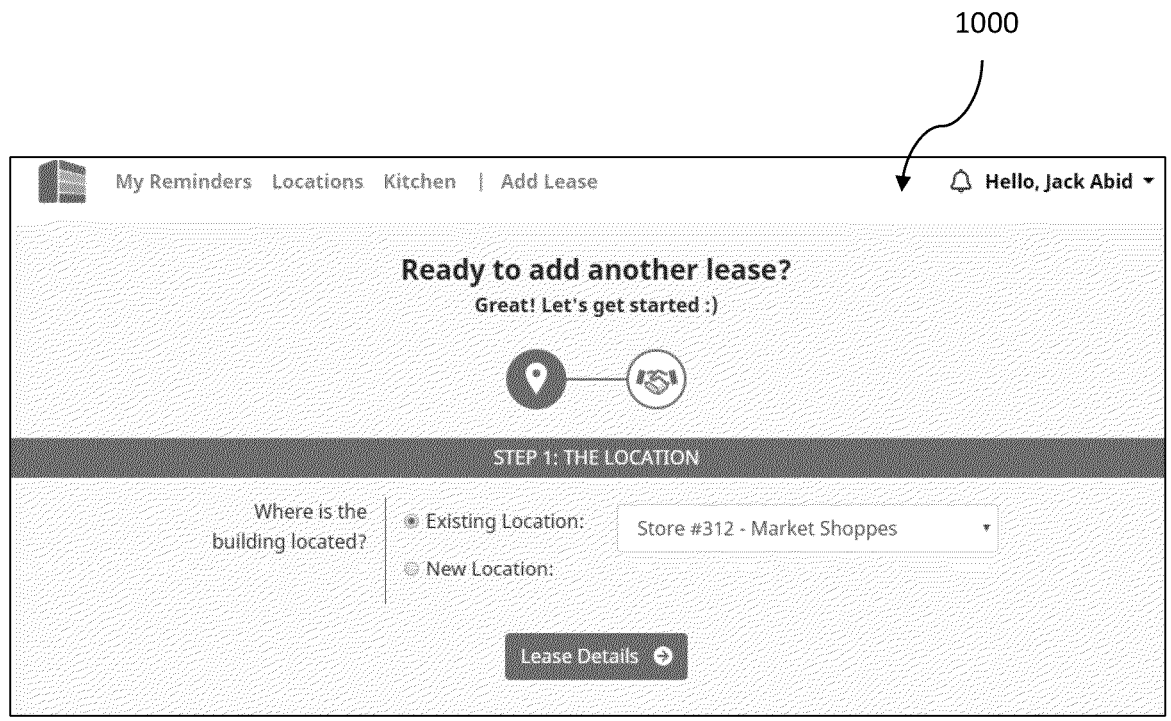
Figure 9L:
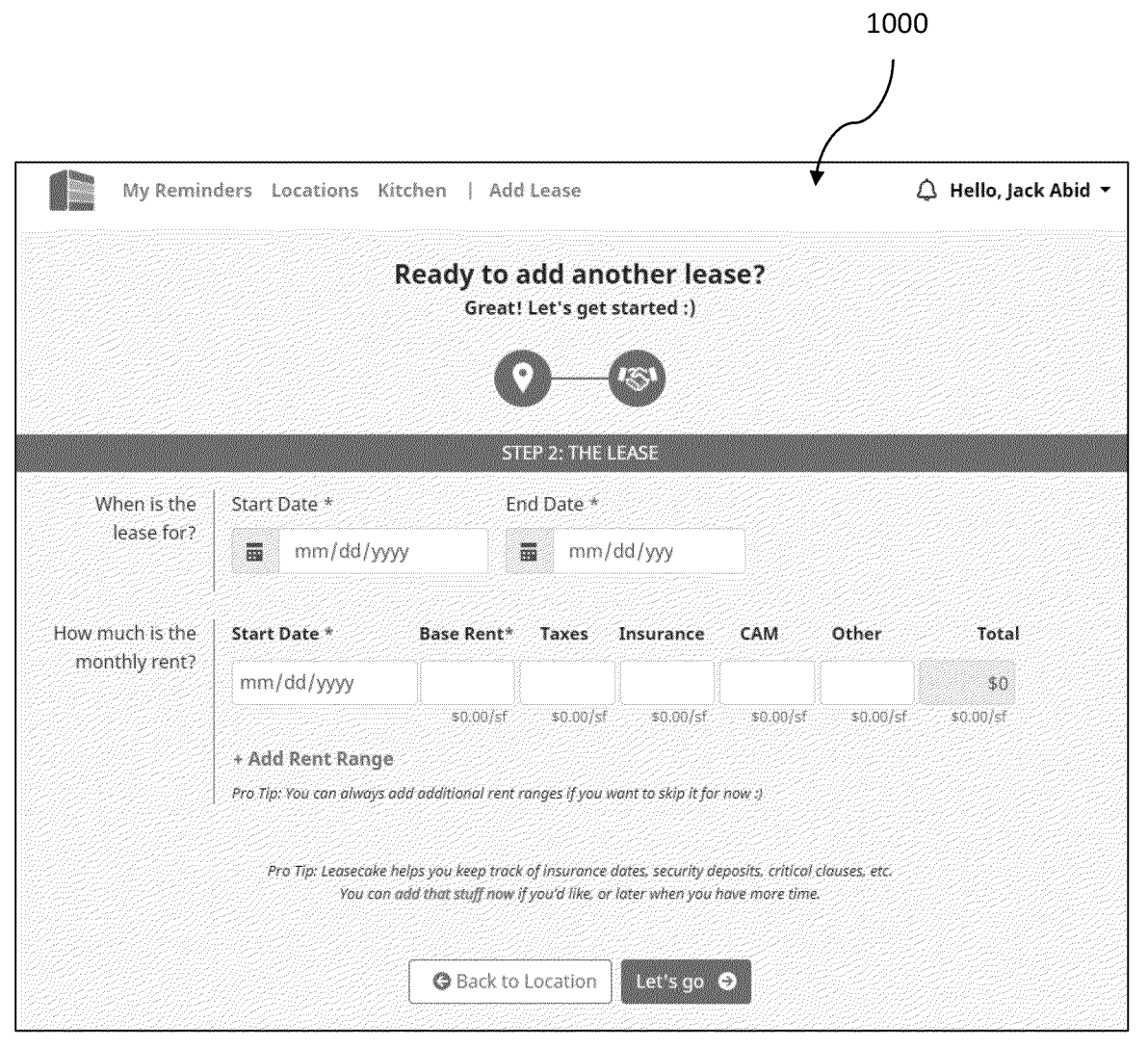
Figure 9M:

Referring now to FIGS. 9A-9M, the tenant web interface 136*b* is shown. In FIGS. 9A-9B, the reminders interface 970 is shown. In FIG. 9C, the locations interface 980 is show, which provides a listing of all leased locations by the tenant user 141. In FIGS. 9D-9H, the kitchen interface 990 is shown, and illustratively includes a companies tab (FIGS. 9D-9E). The kitchen interface 990 illustratively comprises a brands tab (FIGS. 9F-9G), an event and reminders tab (FIG. 9H), a contacts tab (not shown, but similar to same tab in landlord web interface), and team tab (not shown, but similar to same tab in landlord web interface). In FIGS. 9I-9L, the interface 1000 for adding a new lease document is shown. In FIG., an invited tenant interface 1010 is shown. For example, here, the landlord user 140 has invited the tenant user 141. The invited tenant interface 1010 illustratively includes relevant information regarding the associated lease document (i.e. the illustrated monthly rent payment, lease start and end dates, rent increases, and tenant identity information).

Helpfully, the web interface 136*a*-136*c* provides a robust management tool for the landlord user 140 and the tenant user 141. The interface provides for easy ingestion of data and permits the landlord user 140 and the tenant user 141 to manage the large number of lease events.

The lease management system 130 provides a commercial real estate lease management platform that optimizes, manages, and communicates key lease events and transactions in simple fashion. The lease management system 130 creates value for customers by meeting customer need to maximize revenue through automation of rent increases, lease renewals, and rent collections. Also, the lease management system 130 provides a centralized peer-to-peer (P2P) communication platform between owners, managers, brokers, and tenants to help build trusted connections. The lease management system 130 consolidates these activities onto a mobile platform designed for the way commercial real estate owners work, live, and play.

Another aspect is directed to a method for providing a lease management marketplace social network 137. The method includes storing a lease management database 143 associated with the lease management marketplace social network 137, providing a landlord web interface for accessing the lease management database, and providing a tenant web interface for accessing the lease management database. The method includes ingesting a lease document, via the landlord web interface, from a landlord user 140 into the lease management database 143, and ingesting the lease document, via the tenant web interface, from the tenant user 141 into the lease management database, the lease document comprising a plurality of lease characteristic values. The method also includes processing the plurality of lease characteristic values into a landlord data structure for storage in the lease management database 143. The method includes ingesting a plurality of tenant values, via the tenant web interface, from a tenant user 141 into the lease management database 143, and determining a match between the tenant user and the landlord user 140 by correlating the lease document and at least one tenant value.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A lease management system for providing a lease management marketplace social network, the lease management system comprising:
    a first communications device associated with a landlord user;
    a second communications device associated with a tenant user; and
    a server in communication with said first communications device and said second communications device, said server configured to
        store a lease management database associated with the lease management marketplace social network, the lease management marketplace social network comprising the landlord user, the tenant user, and other users,
        provide a landlord web interface and a tenant web interface respectively for the landlord user and the tenant user for accessing the lease management database, the landlord web interface and the tenant web interface each accessing different portions of the lease management database,
        ingest a plurality of lease documents via the landlord web interface into the lease management database based upon an electronic text recognition process, and parse aggregate text of the plurality of lease documents to generate for each lease document, a plurality of lease characteristic values,
        receive a plurality of tenant values via the tenant web interface into the lease management database,
        aggregate data from the plurality of lease characteristic values of the plurality of lease documents, and the received plurality of tenant values in the lease management database,
provide, within the landlord web interface, a rent roll interface comprising
a chronological timeline for a plurality of scheduled rent payments for the plurality of lease documents,
a plurality of buttons respectively associated with the plurality of scheduled rent payments, and
a plurality of detailed information interfaces respectively associated with the plurality of scheduled rent payments and accessed respectively via the plurality of buttons,
determine a match between the tenant user and the landlord user by correlating a respective lease document and at least one tenant value, the respective lease document being related to an existing lease between the tenant user and the landlord user, and
when the match between the tenant user and the landlord user exists,
create a connection between the landlord user and the tenant user in the lease management marketplace social network, and between third party users associated with the landlord user and the tenant user in the lease management marketplace social network, and
cross-populate data between the landlord web interface and the tenant web interface based upon the match between the tenant user and the landlord user so that missing information in the landlord web interface and the tenant web interface is populated based upon available information in connected user profiles of the landlord user and the tenant user in the lease management marketplace social network.

2. The lease management system of claim 1 further comprising a third communications device associated with a third party user; and wherein said server is configured to provide a third party web interface for accessing different portions of the lease management database.

3. The lease management system of claim 2 wherein said server is configured to, when the third party user is connected with at least one of the landlord user and the tenant user in the lease management marketplace social network, provision the third party user to have access to data associated with the at least one of the landlord user and the tenant user in the lease management database.

4. The lease management system of claim 1 wherein said server is configured to provide, within the landlord web interface, a property status interface for the plurality of lease documents.

5. The lease management system of claim 1 wherein said server is configured to cross-reference data in the landlord web interface and the tenant web interface based upon the match between the tenant user and the landlord user.

6. The lease management system of claim 1 wherein said server is configured to provide, within the landlord web interface and the tenant web interface, a cumulative view comprising average values for the plurality of lease characteristic values within a geographic area.

7. A lease management marketplace social network system for a lease management marketplace social network, the lease management marketplace social network system comprising:
a processor and a memory coupled thereto and configured to
provide the lease management marketplace social network, and store a lease management database associated with the lease management marketplace social network, a landlord user and a tenant user being members of the lease management marketplace social network,
provide a landlord web interface and a tenant web interface respectively for the landlord user and the tenant user for accessing the lease management database, the landlord web interface and the tenant web interface each accessing different portions of the lease management database,
ingest a plurality of lease documents via the landlord web interface into the lease management database based upon an electronic text recognition process, and parse aggregate text of the plurality of lease documents to generate for each lease document, a plurality of lease characteristic values,
receive a plurality of tenant values via the tenant web interface into the lease management database,
aggregate data from the plurality of lease characteristic values of the plurality of lease documents, and the received plurality of tenant values in the lease management database,
provide, within the landlord web interface, a rent roll interface comprising
a chronological timeline for a plurality of scheduled rent payments for the plurality of lease documents,
a plurality of buttons respectively associated with the plurality of scheduled rent payments, and
a plurality of detailed information interfaces respectively associated with the plurality of scheduled rent payments and accessed respectively via the plurality of buttons,
determine a match between the tenant user and the landlord user by correlating a respective lease document and at least one tenant value, the respective lease document being related to an existing lease between the tenant user and the landlord user, and
when the match between the tenant user and the landlord user exists,
create a connection between the landlord user and the tenant user in the lease management marketplace social network, and between third party users associated with the landlord user and the tenant user in the lease management marketplace social network, and
cross-populate data between the landlord web interface and the tenant web interface based upon the match between the tenant user and the landlord user so that missing information in the landlord web interface and the tenant web interface is populated based upon available information in connected user profiles of the landlord user and the tenant user in the lease management marketplace social network.

8. The lease management marketplace social network system of claim 7 wherein said processor and memory are configured to provide a third party web interface for accessing different portions of the lease management database.

9. The lease management marketplace social network system of claim 8 wherein said processor and memory are configured to, when a third party user is connected with at least one of the landlord user and the tenant user in the lease management marketplace social network, provision the third party user to have access to data associated with the at least one of the landlord user and the tenant user in the lease management database.

10. The lease management marketplace social network system of claim 7 wherein said processor and memory are configured to provide, within the landlord web interface, a property status interface for the plurality of lease documents.

11. The lease management marketplace social network system of claim 7 wherein said processor and memory are configured to cross-reference data in the landlord web interface and the tenant web interface based upon the match between the tenant user and the landlord user.

12. The lease management marketplace social network system of claim 7 wherein said processor and memory are configured to provide, within the landlord web interface and the tenant web interface, a cumulative view comprising average values for the plurality of lease characteristic values within a geographic area.

13. A method for operating a lease management system providing a lease management marketplace social network, the lease management system comprising a first communications device associated with a landlord user, and a second communications device associated with a tenant user, the method comprising:
   storing a lease management database associated with the lease management marketplace social network, the lease management marketplace social network comprising the landlord user, the tenant user, and other users;
   providing a landlord web interface and a tenant web interface respectively for the landlord user and the tenant user for accessing the lease management database, the landlord web interface and the tenant web interface each accessing different portions of the lease management database;
   ingesting a plurality of lease documents via the landlord web interface into the lease management database based upon an electronic text recognition process, and parse aggregate text of the plurality of lease documents to generate for each lease document, a plurality of lease characteristic values;
   receiving a plurality of tenant values via the tenant web interface into the lease management database;
   aggregating data from the plurality of lease characteristic values of the plurality of lease documents, and the received plurality of tenant values in the lease management database;
   providing, within the landlord web interface, a rent roll interface comprising
      a chronological timeline for a plurality of scheduled rent payments for the plurality of lease documents,
      a plurality of buttons respectively associated with the plurality of scheduled rent payments, and
      a plurality of detailed information interfaces respectively associated with the plurality of scheduled rent payments and accessed respectively via the plurality of buttons,
   determining a match between the tenant user and the landlord user by correlating a respective lease document and at least one tenant value, the respective lease document being related to an existing lease between the tenant user and the landlord user; and
   when the match between the tenant user and the landlord user exists,
      creating a connection between the landlord user and the tenant user in the lease management marketplace social network, and between third party users associated with the landlord user and the tenant user in the lease management marketplace social network, and
      cross-populating data between the landlord web interface and the tenant web interface based upon the match between the tenant user and the landlord user so that missing information in the landlord web interface and the tenant web interface is populated based upon available information in connected user profiles of the landlord user and the tenant user in the lease management marketplace social network.

14. The method of claim 13 further comprising providing a third party web interface for a third party user to access different portions of the lease management database.

15. The method of claim 14 further comprising when the third party user is connected with at least one of the landlord user and the tenant user in the lease management marketplace social network, provisioning the third party user to have access to data associated with the at least one of the landlord user and the tenant user in the lease management database.

\* \* \* \* \*